US012279998B2

(12) United States Patent
Iwase et al.

(10) Patent No.: US 12,279,998 B2
(45) Date of Patent: Apr. 22, 2025

(54) WHEELCHAIR

(71) Applicant: MAZDA MOTOR CORPORATION, Hiroshima (JP)

(72) Inventors: Takashi Iwase, Hiroshima (JP); Isao Toda, Hiroshima (JP); Chih-Hung Chen, Beidou Town, Changhua County (TW); Yu-chao Wei, BeidouTown, Changhua County (TW)

(73) Assignee: MAZDA MOTOR CORPORATION, Hiroshima (JP)

( * ) Notice: Subject to any disclaimer, the term of this patent is extended or adjusted under 35 U.S.C. 154(b) by 659 days.

(21) Appl. No.: 17/567,703

(22) Filed: Jan. 3, 2022

(65) Prior Publication Data

US 2022/0233373 A1 Jul. 28, 2022

(30) Foreign Application Priority Data

Jan. 27, 2021 (JP) ................................ 2021-011284

(51) Int. Cl.
*A61G 5/08* (2006.01)

(52) U.S. Cl.
CPC .......... *A61G 5/0816* (2016.11); *A61G 5/0866* (2016.11); *A61G 5/0883* (2016.11)

(58) Field of Classification Search
CPC ................ A61G 5/0816; A61G 5/0883; A61G 5/0866
USPC ...................................................... 280/250.1
See application file for complete search history.

(56) References Cited

U.S. PATENT DOCUMENTS 4,736,960 A * 4/1988 Batty ..................... A61G 5/085 280/649
6,467,788 B1 * 10/2002 Li ........................ A61G 5/1089 280/649
8,454,048 B1 * 6/2013 Regan .................. A61G 5/0825 280/649
8,573,622 B2 * 11/2013 Papi ....................... A61G 5/022 280/250.1
2002/0093156 A1 7/2002 Stevens et al.

FOREIGN PATENT DOCUMENTS

| | | | |
|---|---|---|---|
| CN | 206044940 | U | 3/2017 |
| JP | H10-85269 | A | 4/1998 |
| JP | 2001-025486 | A | 1/2001 |
| JP | 3081508 | U | 11/2001 |
| JP | 2016-198334 | A | 12/2016 |

* cited by examiner

*Primary Examiner* — Jacob D Knutson
*Assistant Examiner* — Morgan Rappe
(74) *Attorney, Agent, or Firm* — Studebaker Brackett PLLC

(57) ABSTRACT

To make it easier to lift and move a wheelchair by keeping casters from hanging even when the wheelchair is lifted by one hand, a wheelchair includes a folding mechanism that couples a left-side support arm and a right-side support arm foldably in a left-right direction of the vehicle body. The folding mechanism includes an operation part for use in changing a state of a left-side support arm and a right-side support arm from one of a folded state or an unfolded state to another. The operation part is arranged between a rear drive wheel and a caster in a side view of the vehicle body.

2 Claims, 28 Drawing Sheets

WHEELCHAIR

CROSS-REFERENCE TO RELATED APPLICATION

This application claims priority to Japanese Patent Application No. 2021-011284 filed on Jan. 27, 2021, the entire disclosure of which is incorporated by reference herein.

BACKGROUND

The present disclosure relates to a foldable wheelchair configured to be foldable.

Foldable wheelchairs configured to be foldable when not in use have been traditionally known (e.g., see Japanese Unexamined Patent Publication No. 2016-198334). The wheelchair of Japanese Unexamined Patent Publication No. 2016-198334 includes left- and right-side frames that pivotably support driving wheels, and a support arm and a cross member that connect the left- and right-side frames. At a time of using the wheelchair, the support arm and the cross member are swung in directions to spread the distance between the left- and right-side frames so as to make the support arm and the cross member in an unfolded state. On the other hand, when the wheelchair is not used, arm supports of the left- and right-side frames are held and a force is applied in directions to narrow the distance between the left- and right-side frames so as to swing the support arm and the cross member to a folded state.

SUMMARY

As in the wheelchair of Japanese Unexamined Patent Publication No. 2016-198334, by folding the wheelchair and make it compact while not in use, the space required for storage of the wheelchair can be small. For this reason, foldable wheelchairs are widely used.

Meanwhile, there is a case of lifting and move the wheelchair by one hand after folding the wheelchair body. Wheelchairs in general are not expected to be lifted by one hand in the first place. Therefore, in such a case, it is hard to find where to hold. Even if the wheelchair is held by one hand, the wheelchair that is not expected to be held by one hand is likely to become unstable and is likely to end up being inclined with its front part lower than its rear part. Since the wheelchair has pivotable casters (front wheels) in its front part, the casters hang down and contacts the ground when the front part of the wheelchair is lowered. For this reason, the wheelchair needs to be lifted to a higher position.

Further, in cases of a wheelchair user capable of driving a motor vehicle, the wheelchair user may drive the motor vehicle alone to expand the freedom of his/her activities. In this case, the wheelchair user needs to move the wheelchair outside the motor vehicle to the inside after the wheelchair user has moved from the wheelchair to the driver seat of the motor vehicle. At this time, it is difficult to lift the wheelchair with both hands, and there is no choice but to lift the wheelchair by one hand. Doing so, however, causes the casters to hand down and contact the lower edge part of the door opening, causing difficulty to stow the wheelchair inside. It is therefore necessary to lift the wheelchair to a higher position, which is a significant burden for the wheelchair user.

In view of the above points, an object of the present disclosure is to make it easier to lift and move a wheelchair by keeping casters from hanging even when the wheelchair is lifted by one hand.

To achieve the above object, a first aspect of the present disclosure premises a foldable wheelchair that allows a wheelchair user to sit thereon. The wheelchair includes: a left-side frame that pivotably supports a rear drive wheel on a left side of a vehicle body, and has a caster attached pivotably about a center line extended in an upward-downward direction, at a part distanced from the rear drive wheel towards a front of the vehicle body; a right-side frame that pivotably supports a rear drive wheel on a right side of the vehicle body, and has a caster attached pivotably about a center line extended in the upward-downward direction, at a part distanced from the rear drive wheel towards the front of the vehicle body; a left-side support arm pivotably coupled to the left-side frame; a right-side support arm pivotably coupled to the right-side frame; a folding mechanism coupling the left-side support arm and the right-side support arm in a foldable manner in a left-right direction of the vehicle body. The folding mechanism includes an operation part for use in changing a state of the left-side support arm and the right-side support arm from one of a folded state or an unfolded state to another. The operation part is arranged between the rear drive wheel and the caster in a side view of the vehicle body.

According to the configuration, the left-side support arm and the right-side support arm can be easily changed from the unfolded state to the folded state, or from the folded state to the unfolded state by operating the operation part. Therefore, for example, a wheelchair user can fold the wheelchair to make it compact or unfold the wheelchair so that he/she can sit thereon, while the wheelchair user sits on a driver seat or a passenger seat of a motor vehicle.

The wheelchair can be lifted by holding the operation part with one hand after the wheelchair is folded. Here, the center of gravity of a wheelchair in general is positioned in the vicinity of the rear wheels. Therefore, holding the operation part between the rear wheel and the caster in a side view of the vehicle body after the wheelchair is folded causes the rear part of the wheelchair body to be in a position lower than the front part thereof. Therefore, the casters are kept from hanging down, and are less likely to contact the lower edge of the opening of the door, in a case of, for example, moving the wheelchair from outside the motor vehicle to the inside.

In a second aspect of the present disclosure, the left-side support arm includes a first left-side support arm and a second left-side support arm arranged on the rear side of the vehicle body relative to the first left-side support arm, and the right-side support arm includes a first right-side support arm and a second right-side support arm arranged on the rear side of the vehicle body relative to the first right-side support arm. The folding mechanism foldably couples the first left-side support arm and the first right-side support arm, while foldably coupling the second left-side support arm and the second right-side support arm. The operation part is arranged above the first left-side support arm and the first right-side support arm and is for operating the first left-side support arm and the first right-side support arm.

According to the configuration, the first left-side support arm and the first right-side support arm couples the left-side frame and the right-side frame. Further, the second left-side support arm and the second right-side support arm couples the left-side frame and the right-side frame. Therefore, the left-side frame and the right-side frame are coupled at least at two positions apart from each other in the front-rear direction. This strengthens the wheelchair body. In this case, a part of the wheelchair forward to the center of gravity thereof can be lifted by arranging the operation part above the first left-side support arm and the first right-side support arm positioned relatively front. Therefore, the casters are kept from hanging down.

In a third aspect of the present disclosure, the folding mechanism includes an interlocking member that couples, in an interlocking manner, the first left-side support arm and the first right-side support arm with the second left-side support arm and the second right-side support arm.

According to the configuration, the first left-side support arm and the first right-side support arm can be folded or unfolded by operating the operation part. Here, the first left-side support arm and the first right-side support arm are coupled with the second left-side support arm and the second right-side support arm via the interlocking member. Therefore, the first left-side support arm and the first right-side support arm can be interlocked with the second left-side support arm and the second right-side support arm via the interlocking member. Thus, simply operating a single operation part allows folding and unfolding of the first left-side support arm and the first right-side support arm, as well as the second left-side support arm and the second right-side support arm.

In a fourth aspect of the present disclosure, the first left-side support arm and the first right-side support arm are in a position higher than the second left-side support arm and the second right-side support arm.

According to the configuration, the positions of the first left-side support arm and the first right-side support arm are relatively high, and therefore the operation part arranged above the first left-side support arm and the first right-side support arm are also positioned at a relatively high position. This makes it easier for the wheelchair user to hold the operation part.

A fifth aspect of the present disclosure includes a seat frame that supports a seat cushion part, on which a wheelchair user is to be seated, and is configured to be attachable to and detachable from the left-side frame and the right-side frame. The operation part is positioned on the front of the vehicle body relative to a center of gravity of the wheelchair body while the seat frame is detached.

According to the configuration, the seat frame is detached from the left-side frame and the right-side frame before the wheelchair is folded, and then the wheelchair can be folded. For example, at a time of loading the wheelchair into the motor vehicle, it is possible to lift only the seat frame to bring it in the motor vehicle, and then lift only the vehicle body of the wheelchair to bring it in the motor vehicle. This reduces the weight that needs to be lifted at a time when the wheelchair is loaded into a motor vehicle. Therefore, the work of loading the wheelchair is made easier. In this case, the casters provided to the wheelchair body are kept from hanging down, because the operation part is positioned on the front side of the center of gravity of the wheelchair body.

In a sixth aspect of the present disclosure, the folding mechanism includes a support member that supports the operation part so as to enable switching between a state of having the operation part reclined rearward of the vehicle body and a state of having the operation part raised upward, and the state of the left-side support arm and the right-side support arm is changed from the unfolded state to the folded state through an operation of switching the state of having the operation part reclined rearward of the vehicle body to the state of having the operation part raised upward.

According to the above configuration, when the wheelchair user having got off the wheelchair folds the unfolded wheelchair and tries to lift up the wheelchair, the wheelchair user holds the operation part to raise it and pull the wheelchair toward him/herself, so that the wheelchair user can lift the wheelchair without taking his/her hand off the operation part. That is, a series of operations from folding to lifting of the wheelchair can be smoothly done without interruption.

As hereinabove described, since the operation part of the folding mechanism for folding the wheelchair is arranged between the rear wheel and the caster in a side view of the vehicle body, it is possible to avoid the casters from hanging when the wheelchair is lifted by holding the operation part. Thus, the wheelchair lifted can be easily moved.

DETAILED DESCRIPTION

Embodiments of the present invention will be described in detail below with reference to the drawings. Note that the following description of preferred embodiment is only an example in nature, and is not intended to limit the scope, applications or use of the present invention.

Figure 1:
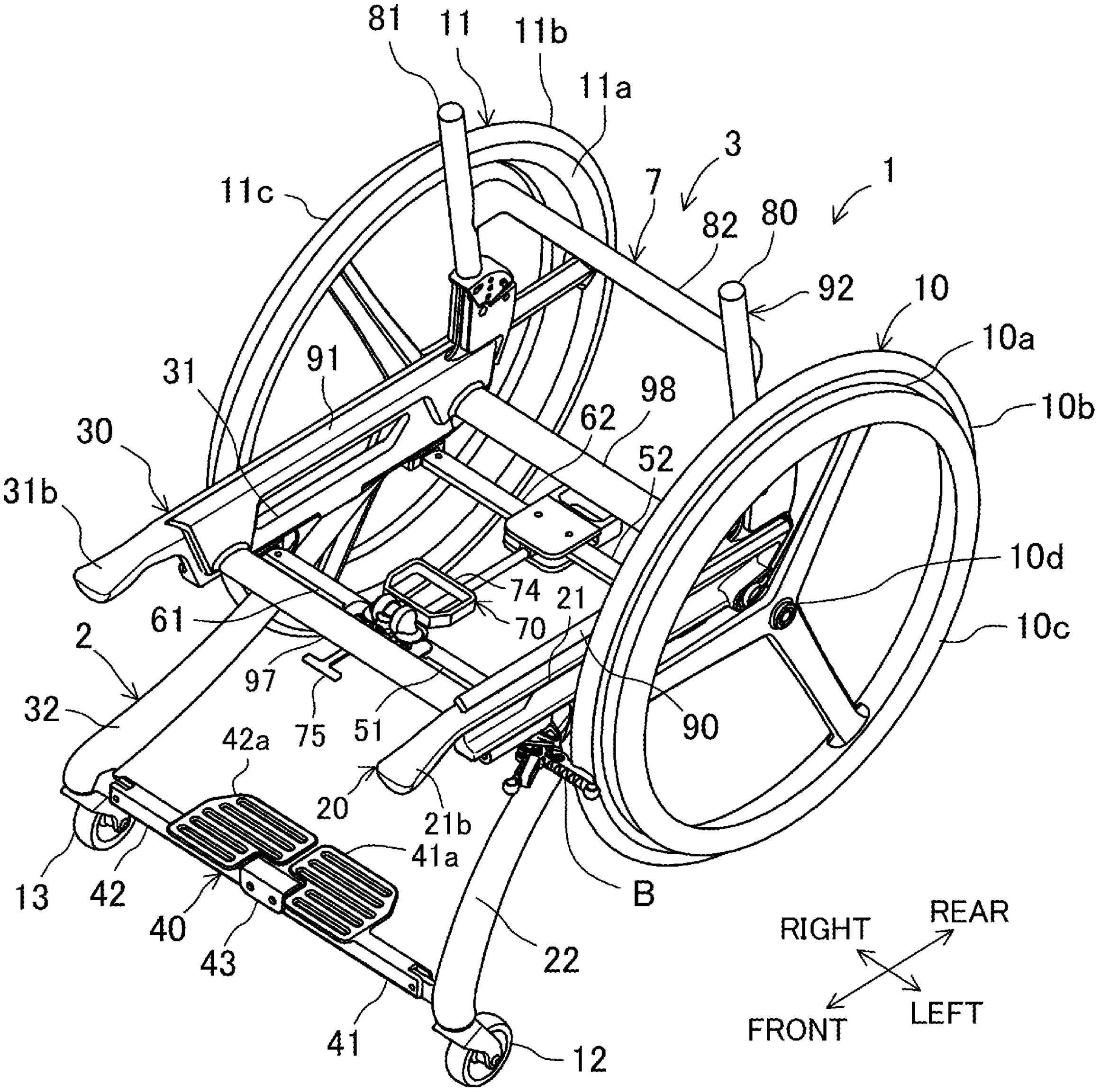
FIG. 1 is a top perspective view of a wheelchair as viewed from above, according to an embodiment of the present invention.
Figure 2:
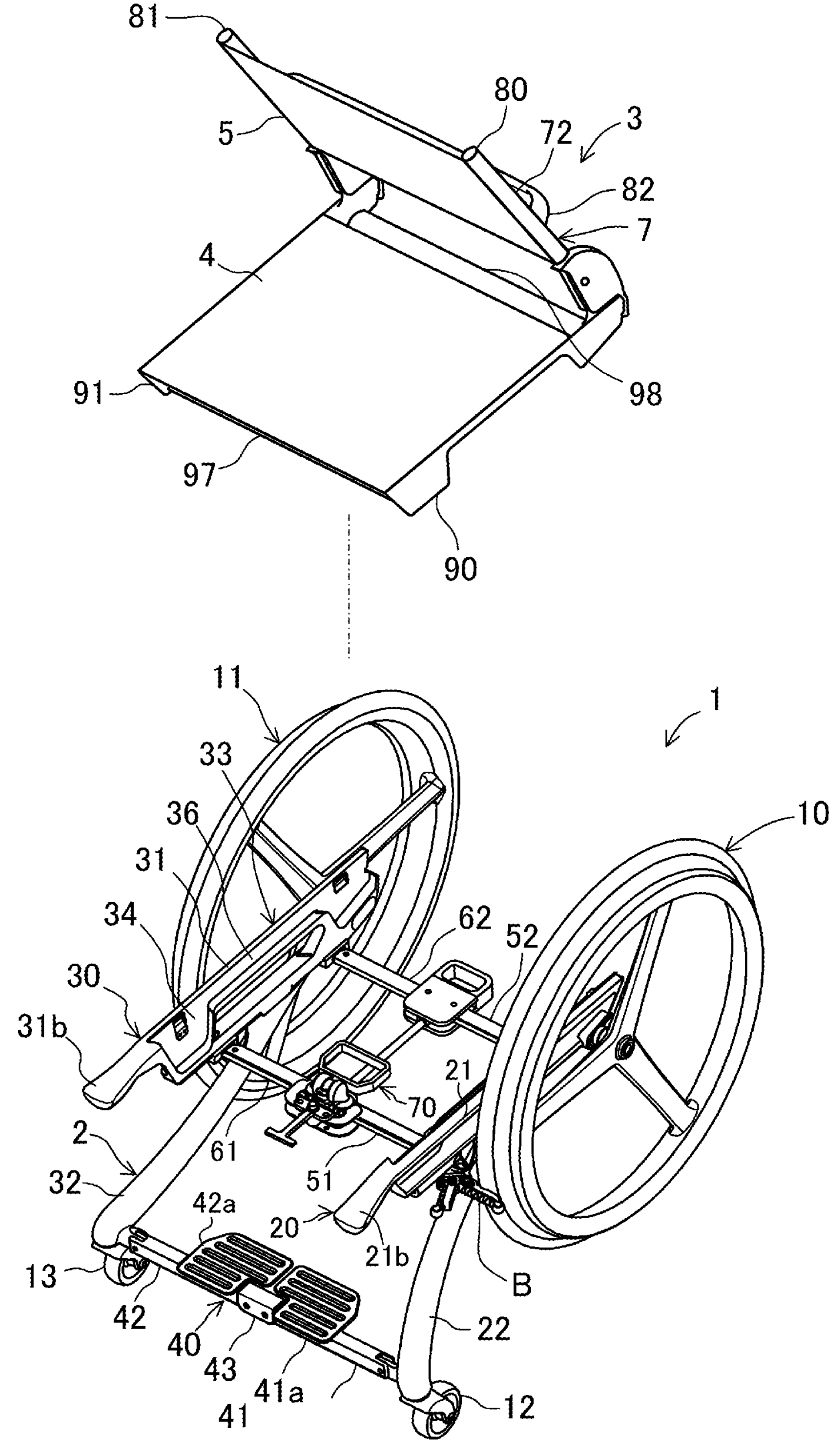
FIG. 2 is a perspective view illustrating a state in which a seat is detached from a wheelchair body.
Figure 3:
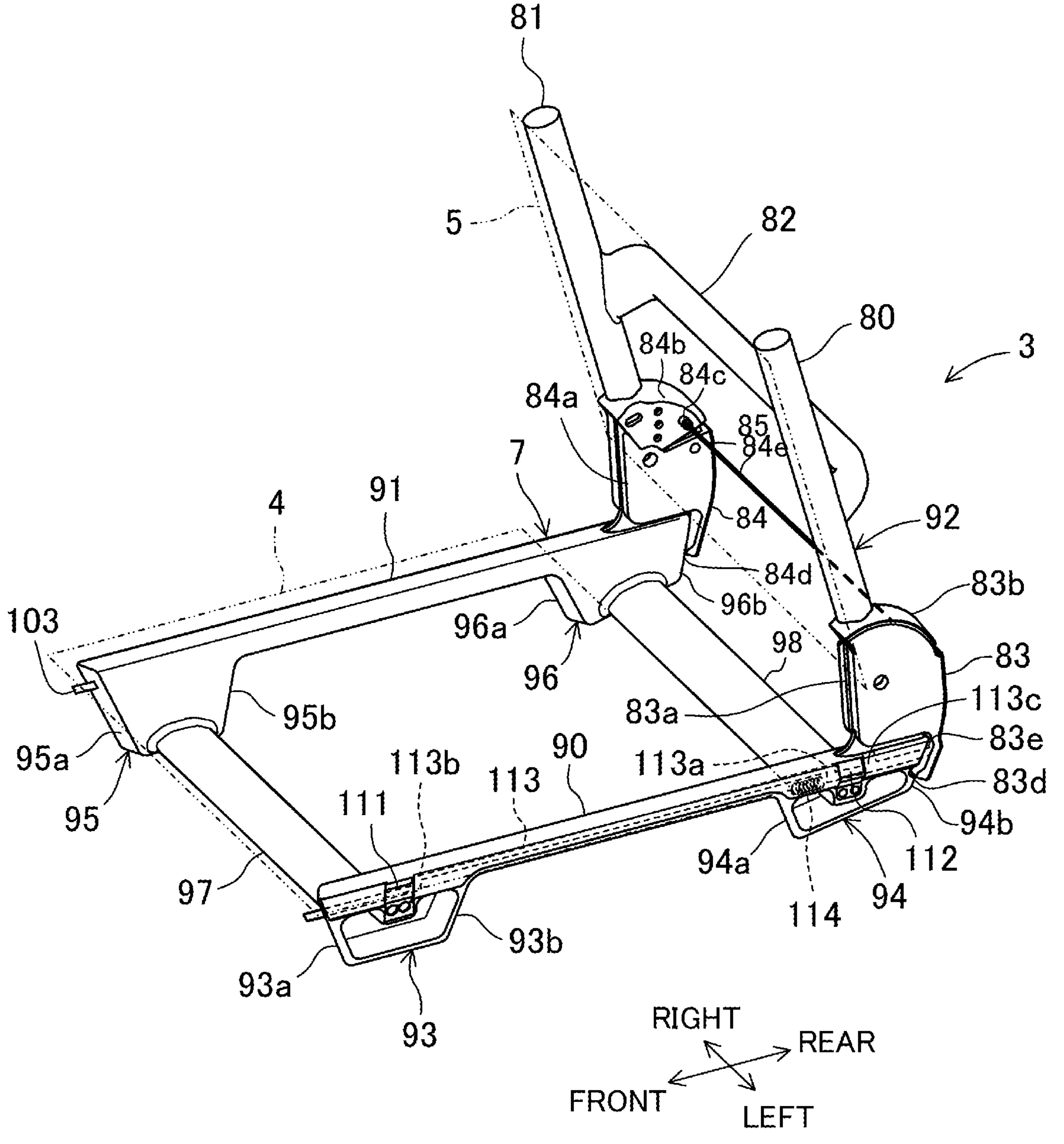
FIG. 3 is a perspective view of a seat frame.
Figure 4:
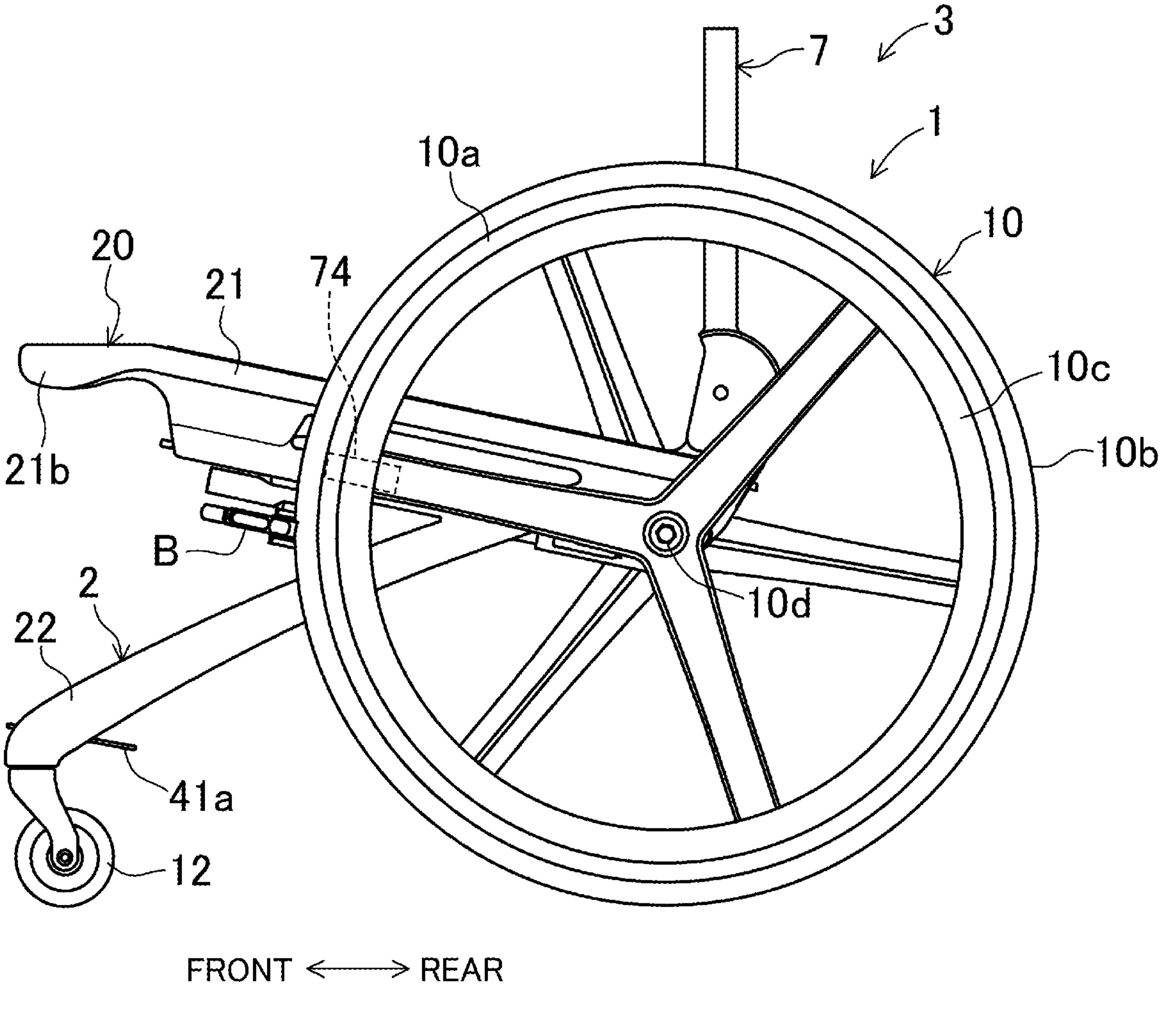
FIG. 4 is a left side view of the wheelchair according to the embodiment of the present invention.
Figure 5:
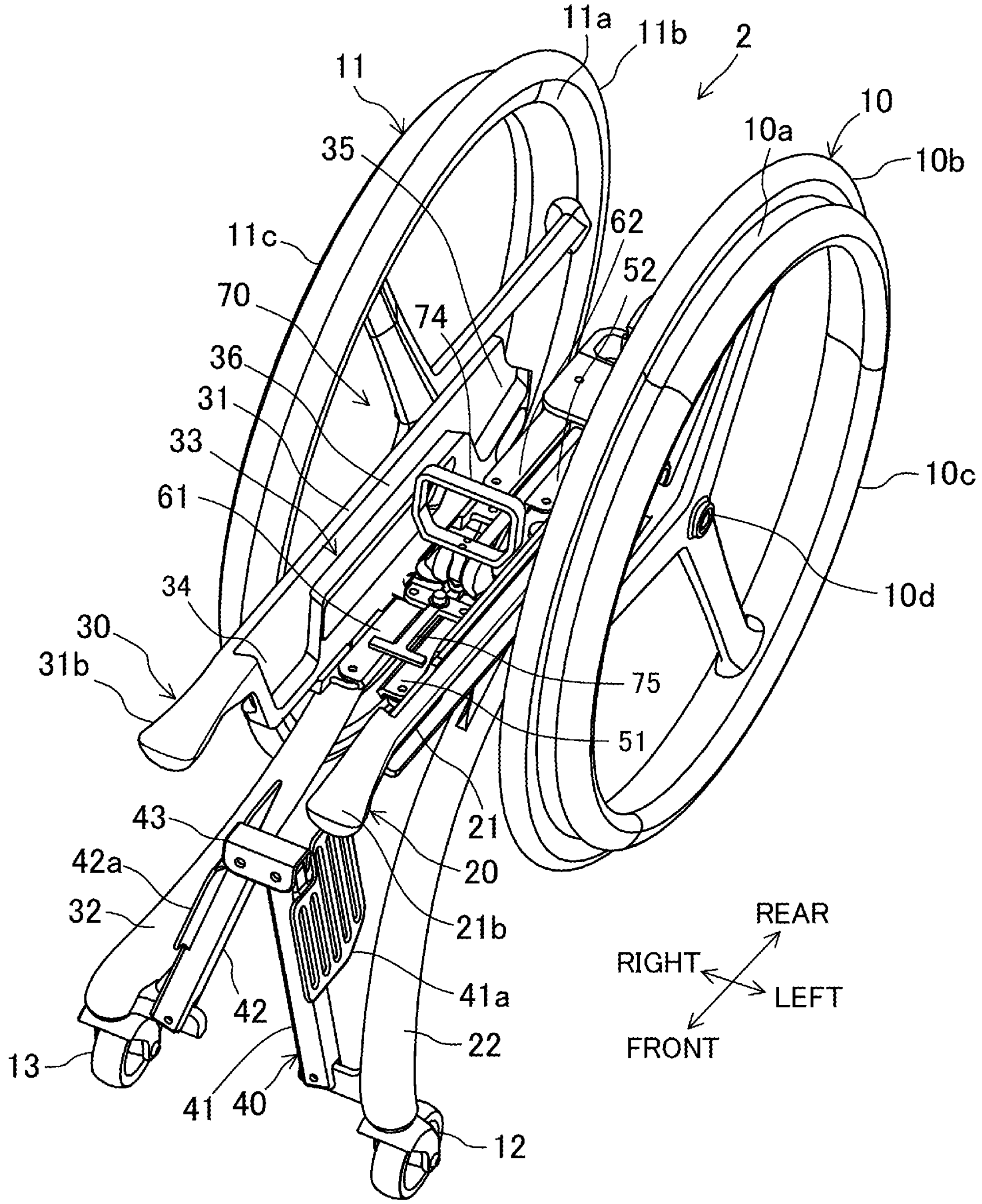
FIG. 5 is a perspective view of the folded wheelchair body as viewed from above.
Figure 6:
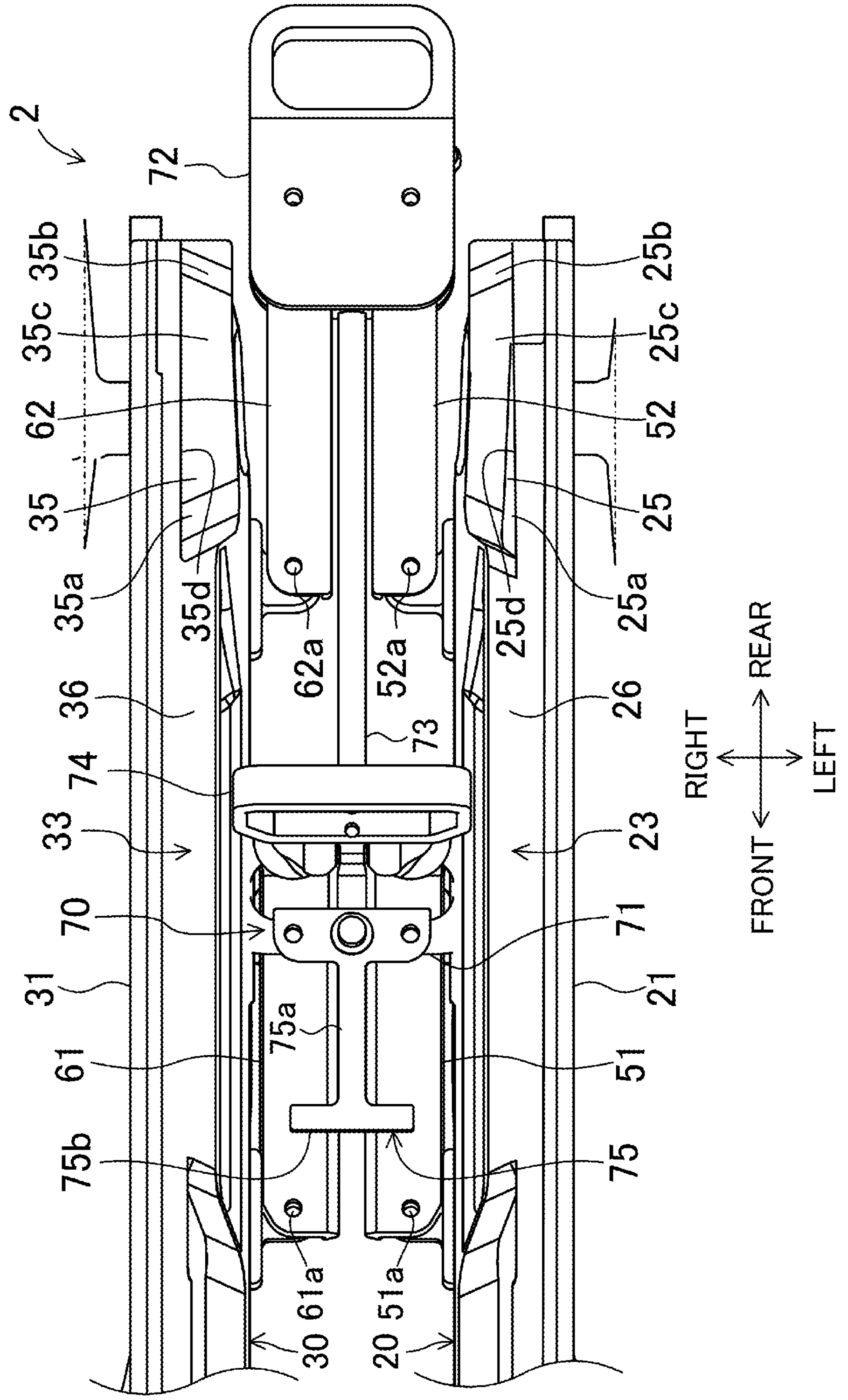
FIG. 6 is a plan view of the wheelchair body folded.

FIG. 1 is a top perspective view of a wheelchair 1 as viewed from the obliquely upper front side, according to an embodiment of the present invention. As illustrated in FIG. 2, the wheelchair 1 can be divided into a wheelchair body 2 and a seat 3 without using tools. The seat 3 is illustrated in FIG. 3. FIG. 4 is a left side view of the wheelchair 1 with the seat 3 attached thereto. The wheelchair body 2 from which the seat 3 is detached is configured to be foldable as illustrated in FIG. 5 and FIG. 6, and therefore, the wheelchair 1 of the present embodiment is a foldable wheelchair.

Note that, while FIG. 2 illustrates a seat cushion part 4 and a back cushion part 5 of the seat 3, FIG. 1 and FIG. 4 omits illustration of the seat cushion part 4 and the back cushion part 5. Further, FIG. 3 only illustrates the outline of the seat cushion part 4 and the back cushion part 5 by using virtual lines. The specific configuration of the seat 3 will be described later.

In the description of this embodiment, a traveling direction in which the wheelchair 1 moves forward is simply referred to as forward, and the front of the wheelchair 1 corresponds to the front of a wheelchair user (not shown) seated on the wheelchair 1. Further, a traveling direction in which the wheelchair 1 moves backward is simply referred to as rearward, and the back of the wheelchair 1 corresponds to the back of the wheelchair user seated on the wheelchair 1. The front-rear direction of the wheelchair 1 is also the longitudinal direction of the vehicle body. The left side of the wheelchair user sitting on the wheelchair 1 is the left side of the vehicle body of the wheelchair 1 and is simply referred to as the left. Further, the right side of the wheelchair user sitting on the wheelchair 1 is the right side of the vehicle body of the wheelchair 1 and is simply referred to as the right. The left-right direction of the wheelchair 1 is also the width direction of the vehicle body. Further, the "upper side" of the wheelchair 1 is a side which becomes the side of the top of the wheelchair 1 when the wheelchair 1 is placed on a horizontal surface in a state that can be seated. The "lower side" of the wheelchair 1 is a side which becomes the side of the bottom of the wheelchair 1 when the wheelchair 1 is placed on a horizontal surface in a state that can be seated.

(Configuration of Wheelchair Body)

As illustrated in FIG. 1, FIG. 4, and the like, the wheelchair body 2 includes left- and right-side driving wheels 10, 11, left side and right side casters 12, 13, and left side and right side frames 20, 30. The driving wheels 10, 11 are large-diameter wheels for the wheelchair user to rotate forward or backward while holding them by hand, and can also be called rear drive wheels because they are provided on the rear side of the wheelchair body 2. The structure of the driving wheels 10, 11 is not particularly limited; however, in this embodiment, the driving wheels 10, 11 are configured by attaching rubber made tires 10*a*, 11*b* to wheels 10*a*, 11*a* made of carbon fiber-reinforced plastic (CFRP). On the outer side of the wheels 10*a*, 11*a* in the vehicle width direction, hand rims 10*c*, 11*c* to be held by the hand of the wheelchair user during driving are provided. Note that the reference character B in FIG. 1, FIG. 2, and FIG. 4 denotes a brake. The brake B is one that is traditionally well known, and is configured to be manually switched between a braking state and a release state.

The casters 12, 13 are wheels for changing the traveling direction of the wheelchair 1, and are smaller in diameter than the driving wheels 10, 11. Since the casters 12, 13 are arranged on the front side of the wheelchair body 2, the casters 12, 13 can also be referred to as front wheels for changing traveling direction.

Figure 7:
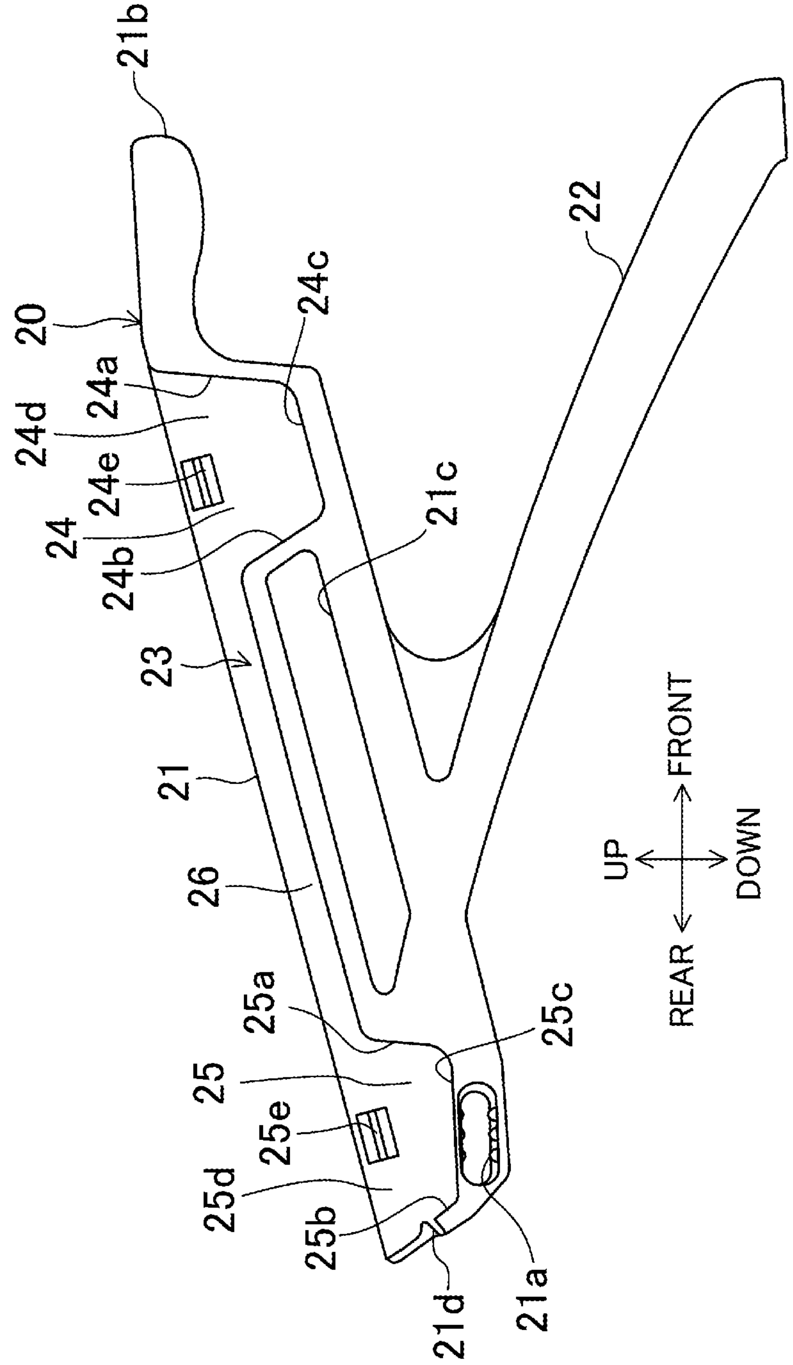
FIG. 7 is a right side view of a left-side frame.

As illustrated in FIG. 7, the left-side frame 20 includes an upper frame part 21 extending in the front-rear direction and a caster support part 22. FIG. 7 illustrates the left-side frame 20 while the wheelchair 1 is placed on a horizontal surface. As illustrated in the figure, the upper frame part 21 is gently inclined upward toward the front. The inclination angle of the upper frame part 21 is not limited to that as illustrated, and may be horizontal. The upper frame part 21 and the caster support part 22 are formed as a single piece by the above-mentioned CFRP, and therefore the left-side frame 20 is formed by a single member. Note that the left-side frame 20 may be formed of a metal material, or by coupling a plurality of members.

In a rear end part of the upper frame part 21, a wheel shaft insertion hole 21*a* is formed. To this wheel shaft insertion hole 21*a*, the right side of a wheel shaft 10*d* of the left-side driving wheel 10 is inserted and fixed. The left-side driving wheel 10 is rotatably and pivotably supported about an axis extending in the left-right direction with respect to the left-side frame 20, while the right side of the wheel shaft 10*d* being fixed to the rear end part of the upper frame part 21.

In the front end part of the upper frame part 21, a front-side protrusion 21*b* protruding forward is provided. The front-side protrusion 21*b* is configured to be foldable by the wheelchair user in the sitting state. In an intermediate part of the upper frame part 21 relative to the front-rear direction, a through-hole 21*c* penetrating the upper frame part 21 in the left-right direction is formed. With this hole, the weight of left-side frame 20 is reduced. The through-hole 21*c* may have a shape elongated in the front-rear direction.

In the rear end part of the upper frame part 21, there is provided a rear-side recess 21*d* formed so as to be recessed forward. The rear-side recess 21*d* is a part to engage with a part of the seat 3, as will be described later.

On the right-side surface of the upper frame part 21, there is provided an accommodation recess 23 for accommodating a left-side seat frame member 90 of the seat 3 (described later). The accommodation recess 23 is open upward so that the seat frame member 90 can be accommodated in the accommodation recess 23 from above. The accommodation recess 23 also opens rightward, that is, inward relative to the width direction of the vehicle body, so that the inner surface of the accommodation recess 23 can be seen from the right side.

The accommodation recess 23 includes three parts. That is, the front-side part of the accommodation recess 23 is a front-side accommodation recess (left-side engagement recess) 24, and the rear-side part of the accommodation recess 23 is a rear-side accommodation recess (left-side engagement recess) 25. Further, a part between the front-side accommodation recess 24 and the rear-side accommodation recess 25 of the accommodation recess 23 is an intermediate accommodation recess 26. Between the front-side accommodation recess 24 and the rear-side accommodation recess 25, the through-hole 21*c* is positioned. Further, the through-hole 21*c* is positioned below the intermediate accommodation recess 26.

The dimensions of the front-side accommodation recess 24 and the rear-side accommodation recess 25 in the depth direction (upward-downward direction) are set to be longer than the dimension of the intermediate accommodation recess 26 in the same direction. Thus, the front-side accommodation recess 24 and the rear-side accommodation recess 25 are formed with more depth than the intermediate accommodation recess 26. The front-side accommodation recess 24 and the rear-side accommodation recess 25 have substantially the same dimension in the front-rear direction. The dimension of the intermediate accommodation recess 26 in the front-rear direction is set to be longer than those of the front-side accommodation recess 24 and the rear-side accommodation recess 25. Thus, the intermediate accommodation recess 26 is longer in the front-rear direction.

The front and rear surfaces of the inner surface of the front-side accommodation recess 24 are a front-side engagement surface 24*a* and a rear-side engagement surface 24*b*, respectively. The dimension of the front-side engagement surface 24*a* in the upward-downward direction is set to be longer than the dimension thereof in the left-right direction. Similarly, the dimension of the rear-side engagement surface 24*b* in the upward-downward direction is also set to be longer than the dimension thereof in the left-right direction. The front-side engagement surface 24*a* and the rear-side engagement surface 24*b* are formed so as to extend in the upward-downward direction, and get closer to each other toward the lower side. That is, the front-side engagement surface 24*a* is an inclined face inclined so as to be positioned rearward as it goes lower side, and the rear-side engagement surface 24*b* is an inclined face inclined so as to be positioned rearward as it goes lower side. Therefore, the distance between the front-side engagement surface 24*a* and the rear-side engagement surface 24*b* becomes narrower toward the lower side. The lower end parts of the front-side engagement surface 24*a* and the rear-side engagement surface 24*b* are apart from each other in the front-rear direction.

Figure 8:
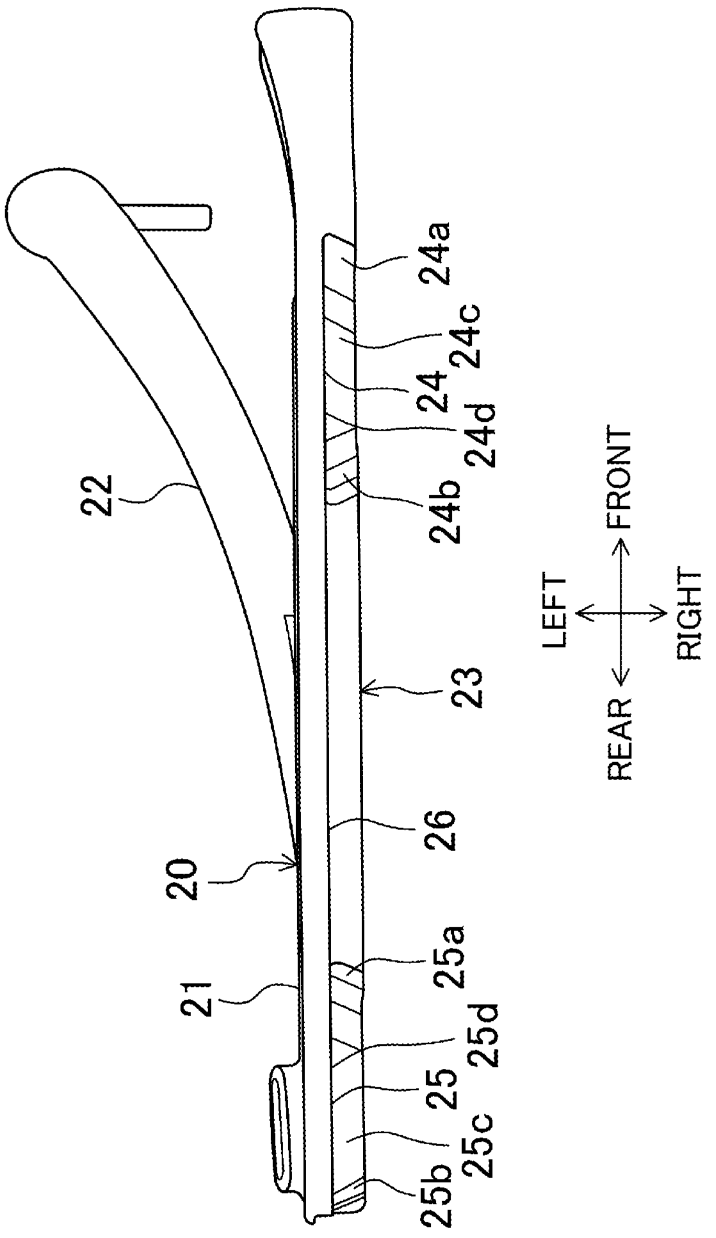
FIG. 8 is a plan view of the left-side frame.

As illustrated in FIG. 8, the front-side engagement surface 24*a* and the rear-side engagement surface 24*b* are formed so as to get closer to each other toward the right side, that is, toward the inner side in the width direction of the vehicle body. That is, the front-side engagement surface 24*a* extends so as to be positioned rearward as it goes to the right side, and the rear-side engagement surface 24*b* extends so as to be positioned forward as it goes to the right side. The right edge part of the front-side engagement surface 24*a* and the rear-side engagement surface 24*b* are distanced from each other in the front-rear direction, and these parts are the parts at which the front-side accommodation recess 24 opens rightward.

A bottom surface 24*c* of the front-side accommodation recess 24 extends from the lower end part of the front-side engagement surface 24*a* to the lower end part of the rear-side engagement surface 24*b*. Further, as illustrated in FIG. 7, a left-side surface 24*d* of the inner surface of the front-side accommodation recess 24 extends from the left end part of the front-side engagement surface 24*a* to the left end part of the rear-side engagement surface 24*b*. In the left-side surface 24*d*, a recessed part 24*e* to be a later-described engaged part is formed so as to be recessed leftward. The recessed part 24*e* is positioned substantially in the middle relative to the front-rear direction, in a position higher than the middle relative to the upward-downward direction, of the left-side surface 24*d*. The shape of the recessed part 24*e* is not particularly limited; however, in this embodiment, the dimension in the front-rear direction is set to be longer than the dimension in the upward-downward direction, in a right side view. The depth (dimension in the left-right direction) of the recessed part 24*e* is set so that the middle part relative to the upward-downward direction is deepest.

The rear-side accommodation recess 25 is configured in the similar manner as the front-side accommodation recess 24. Similarly to the front-side engagement surface 24*a* and the rear-side engagement surface 24*b* of the front-side accommodation recess 24, the front-side engagement surface 25*a* and the rear-side engagement surface 25*b* of the rear-side accommodation recess 25 are formed so as to extend in the upward-downward direction, and get closer to each other toward the lower side. Further, as illustrated in FIG. 8, the front-side engagement surface 25*a* and the rear-side engagement surface 25*b* are formed so as to get closer to each other toward the right side. Further, as illustrated in FIG. 7, a bottom surface 25*c* of the rear-side accommodation recess 25 is positioned immediately above the wheel shaft insertion hole 21*a*. In the left-side surface 25*d* of the inner surface of the rear-side accommodation recess 25, a recessed part 25*e* to be an engaged part is formed so as to be recessed leftward. The shape of the recessed part 24*e* on the front side and the shape of the recessed part 25*e* on the rear side may be the same or different.

As illustrated in FIG. 7, the caster support part 22 extends obliquely downward toward the front from an intermediate part of the upper frame part 21 in the front-rear direction. As illustrated in FIG. 8, the caster support part 22 is curved so that its lower side is positioned on the left side, that is, on the outer side in the width direction of the vehicle body. As illustrated in FIG. 4, the lower end part of the caster support part 22 is in front of the left-side driving wheel 10, apart from the left-side driving wheel 10 by a predetermined distance. To this lower end part, a left-side caster 12 is attached in such a manner as to be capable of pivot about a center axis extended in the upward-downward direction. The caster 12 is positioned directly below the front-side protrusion 21*b* of the upper frame part 21.

Figure 9:
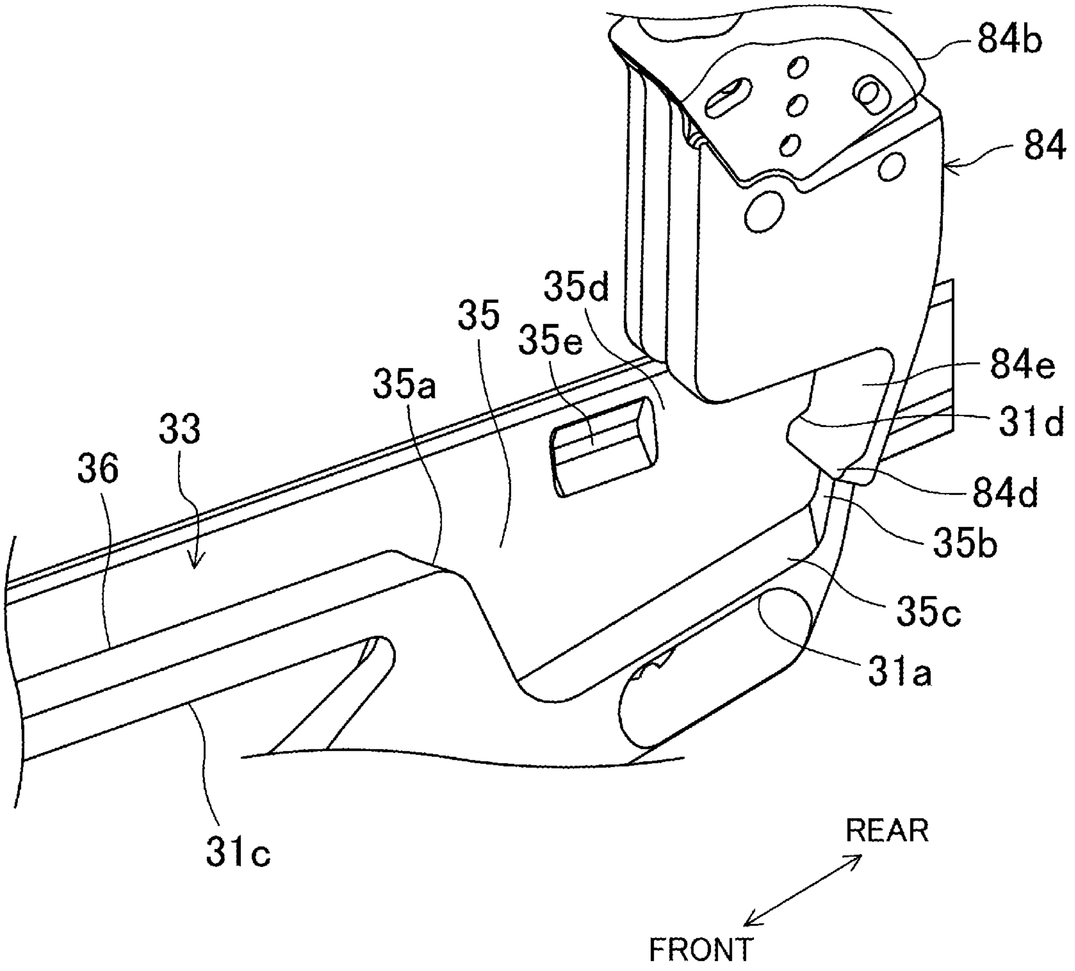
FIG. 9 is a perspective view of a rear side of a right-side frame as viewed from the upper left side.

As illustrated in FIG. 2 and the like, the right-side frame 30 has a symmetrical configuration with respect to the left-side frame 20, and includes an upper frame part 31 and a caster support part 32. As illustrated in FIG. 9, in the upper frame part 31, a wheel shaft insertion hole 31*a* is formed. To this wheel shaft insertion hole 31*a*, the left side of a wheel shaft 11*d* (illustrated in FIG. 14) of the right-side driving wheel 11 is inserted and fixed. The right-side driving wheel 11 is rotatably and pivotably supported about an axis extending in the left-right direction with respect to the right-side frame 30, while the left side of the wheel shaft 11*d* being fixed to the rear end part of the upper frame part 31.

Figure 10:
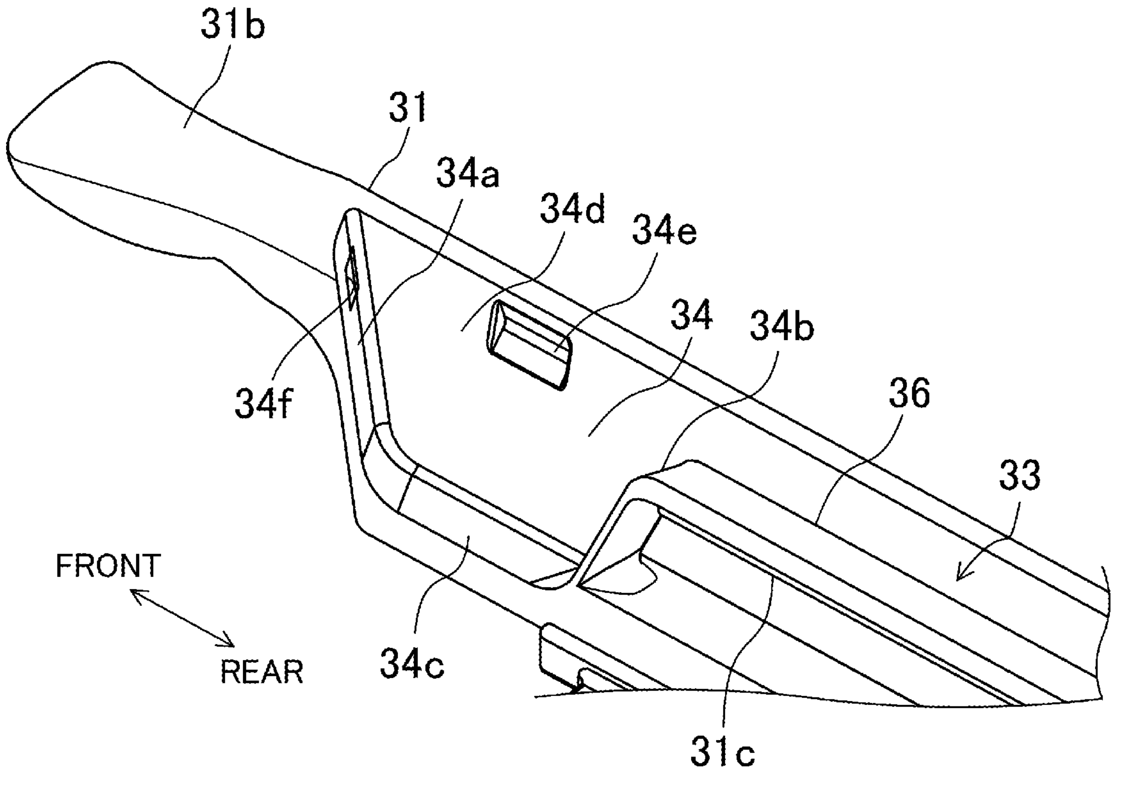
FIG. 10 is a perspective view of a front side of the right-side frame as viewed from the upper left side.

As illustrated in FIG. 10, in the front end part of the upper frame part 31, a front-side protrusion 31*b* is provided. Further, in an intermediate part of the upper frame part 31 relative to the front-rear direction, a through-hole 31*c* penetrating the upper frame part 31 in the left-right direction is formed. In the rear end part of the upper frame part 31, there is provided a rear-side recess 31*d* (illustrated in FIG. 9) formed so as to be recessed forward. Note that FIG. 9 also illustrates a part of a right-side angle changer 84 that is a member constituting a part of the seat 3. This right-side angle changer 84 is hiding a part of the rear end part of the upper frame part 31 in the figure.

As illustrated in FIG. 2, on the left-side surface of the upper frame part 31, there is provided an accommodation recess 33 for accommodating a right-side seat frame member 91 of the seat 3 (described later). The accommodation recess 33 is open toward the upper side and left side, so that the inner surface of the accommodation recess 33 can be seen from the left side.

As illustrated in FIG. 9 and FIG. 10, the accommodation recess 33 has a front-side accommodation recess (right-side engagement recess) 34, a rear-side accommodation recess (right-side engagement recess) 35, and an intermediate accommodation recess 36. As illustrated in FIG. 10, a front-side engagement surface 34*a* and a rear-side engagement surface 34*b* of the front-side accommodation recess 34 are formed so as to extend in the upward-downward direction, and get closer to each other toward the lower side and toward the left side. The inner surface of the front-side accommodation recess 34 includes a bottom surface 34*c* and a right-side surface 34*d*. In the right-side surface 34*d*, a recessed part 34*e* to be an engaged part is formed so as to be recessed rightward.

As illustrated in FIG. 9, the rear-side accommodation recess 35 is configured in a similar manner as the front-side accommodation recess 34, and the front-side engagement surface 35*a* and a rear-side engagement surface 35*b* are formed so as to extend in the upward-downward direction, and get closer to each other toward the lower side and toward the right side. Further, a bottom surface 35*c* of the rear-side accommodation recess 35 is positioned immediately above the wheel shaft insertion hole 31*a*. Further, in the right-side surface 35*d* of the rear-side accommodation recess 35, a recessed part 35*e* to be an engaged part is formed so as to be recessed rightward.

As illustrated in FIG. 1 and the like, the caster support part 32 extends obliquely downward toward the front from an intermediate part of the upper frame part 31 in the front-rear direction, and is curved so that its lower side is positioned on the right side. To the lower end part of the caster support part 32, a right-side caster 13 is attached in such a manner as to be capable of pivot about a center axis extended in the upward-downward direction.

(Configuration of Foot Rest Part)

As illustrated in FIG. 1, a foot rest part 40 on which the wheelchair user places his/her feet is provided in a front part of the wheelchair body 2. The foot rest part 40 includes: a left-side rest arm 41 coupled to a lower end part of the caster support part 22 of the left-side frame 20 so as to be pivotable in the upward-downward direction; a right-side rest arm 42 coupled to a lower end part of the caster support part 32 of the right-side frame 30 so as to be pivotable in the upward-downward direction; and a coupling plate 43 that pivotably couples the right end part of the left-side rest arm 41 and the left end part of the right-side rest arm 42 with each other. The pivotal center lines extend in the front-rear direction. The left-side rest arm 41 has a left plate 41*a* for placing thereon the left foot, and the right-side rest arm 42 has a right plate 42*a* for placing thereon the right foot.

As illustrated in FIG. 1 and FIG. 2, the left-side rest arm 41 and the right-side rest arm 42 extend horizontally while the wheelchair body 2 is in an unfolded state. While the wheelchair body 2 is in the folded state, on the other hand, the left-side rest arm 41 and the right-side rest arm 42 are folded in the left-right direction so as to take a posture of extending substantially in the upward-downward direction, with the coupling plate 43 arranged on top, as illustrated in FIG. 5. In short, the left-side rest arm 41 and the right-side rest arm 42 are pivotable relative to each other so as not to inhibit the folding operation of the wheelchair body 2.

(Unfolding and Folding of Wheelchair Body)

The wheelchair body 2 can be changed from the unfolded state illustrated in FIG. 1 and FIG. 2 to the folded state illustrated in FIG. 5 and FIG. 6 and from the folded state to the unfolded state, without using a tool or the like. In the unfolded state, the distance between the left-side frame 20 and the right-side frame 30 expands and attachment of the seat 3 becomes possible. In the folded state, on the other hand, the distance between the left-side frame 20 and the right-side frame 30 is narrowed and attachment of the seat 3 is not possible. In the present embodiment, the seat 3 and the wheelchair body 2 are configured to be separable and attachable. By detaching the seat 3 from the wheelchair body 2 while the wheelchair 1 is not in use, the wheelchair body 2 and the seat 3 are separated from each other, which reduces the weight for carrying them and makes them compact. Further, since the wheelchair body 2 is foldable, the wheelchair body 2 is made compact. In the following, the configuration that makes the wheelchair body 2 foldable will be described in detail.

(Support Arm)

As an exemplary configuration that makes the wheelchair body 2 foldable, the present embodiment adopts a configuration using a plurality of support arms 51, 52, 61, 62. Specifically, the wheelchair body 2 includes: a first left-side support arm 51 and a second left-side support arm 52 that are pivotably coupled to the left-side frame 20, and a first right-side support arm 61 and a second right-side support arm 62 that are pivotably coupled to the right-side frame 30. The first left-side support arm 51 and the first right-side support arm 61 have the same length and are laterally symmetrical. The second left-side support arm 52 and the second right-side support arm 62 have the same length and are laterally symmetrical. Further, the wheelchair body 2 also has a manually operable folding mechanism 70. Note that the first left-side support arm 51 and the first right-side support arm 61 may be laterally asymmetrical, and that the second left-side support arm 52 and the second right-side support arm 62 may also be laterally asymmetrical.

Figure 11:
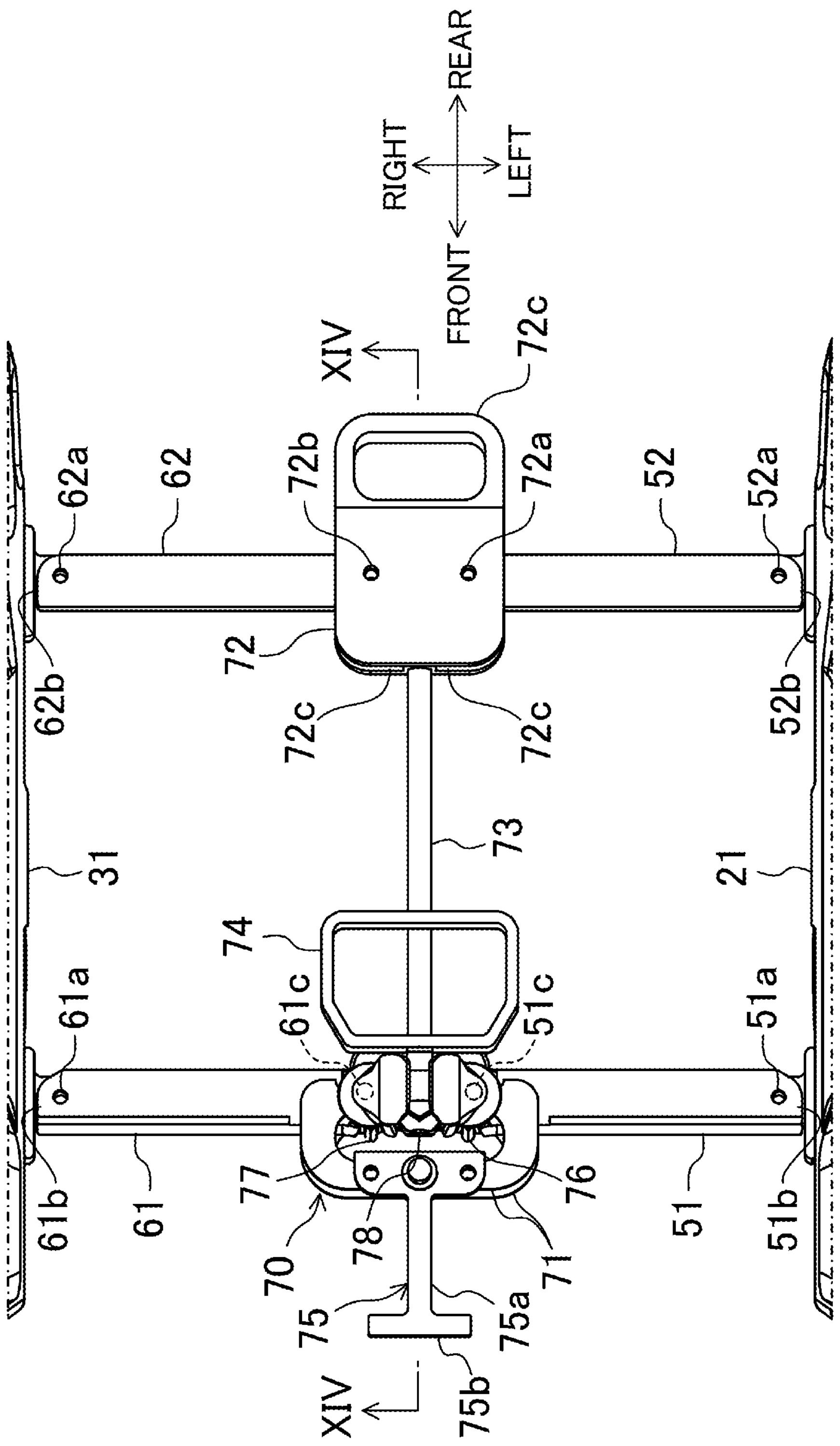
FIG. 11 is a plan view of support arms and a folding mechanism.

As illustrated in FIG. 11, a base end part (one end part) of the first left-side support arm 51 is coupled to the left-side frame 20, at a lower part on the front side of the middle part of the upper frame part 21 relative to the front-rear direction, via a coupling shaft 51*a* extending in the upward-downward direction in such a manner as to be pivotable in the front-rear direction. Further, a base end part (one end part) of the second left-side support arm 52 is coupled to the left-side frame 20, at a lower part on the rear side of the middle part of the upper frame part 21 relative to the front-rear direction, via a coupling shaft 52*a* extending in the upward-downward direction in such a manner as to be pivotable in the front-rear direction. Thus, the second left-side support arm 52 is provided to the rear of the first left-side support arm 51.

The right-side support arms 61, 62 are arranged in a similar manner as the left-side support arms 51, 52, and a base end part (one end part) of the first right-side support arm 61 is coupled to the right-side frame 30, at a lower part on the front side of the middle part of the upper frame part 31 relative to the front-rear direction, via a coupling shaft 61*a* extending in the upward-downward direction in such a manner as to be pivotable in the front-rear direction. Further, a base end part (one end part) of the second right-side support arm 62 is coupled to the right-side frame 30, at a lower part on the rear side of the middle part of the upper frame part 31 relative to the front-rear direction, via a coupling shaft 62*a* extending in the upward-downward direction in such a manner as to be pivotable in the front-rear direction. The center lines of the four coupling shafts Ma, 52*a*, 61*a* and 62*a* are parallel to one another. Further, the four coupling shafts 51*a*, 52*a*, 61*a*, and 62*a* may be vertical or inclined with respect to the vertical line, provided that they extend in the upward-downward direction. The folding operation is possible even if, for example, the four coupling shafts 51*a*, 52*a*, 61*a* and 62*a* are slightly inclined forward or backward.

For example, as illustrated in FIG. 4, when viewing the wheelchair 1 from the left while placing it on a horizontal plane, the upper frame part 21 of the left-side frame 20 is inclined so as to be positioned higher toward the front side. The upper frame part 31 of the right-side frame 30 is also inclined in the same manner. Therefore, the first left-side support arm 51 and the first right-side support arm 61 positioned to the front of the second left-side support arm 52 and the second right-side support arm 62 are in positions higher than the second left-side support arm 52 and the second right-side support arm 62.

As illustrated in FIG. 1, FIG. 2, and FIG. 11, while the wheelchair body 2 is in the unfolded state, the left-side support arms 51, 52 and the right-side support arms 61, 62 all take a posture that extends in the left-right direction to spread the distance between the left-side frame 20 and the right-side frame 30. During this state, the first left-side support arm 51 and the first right-side support arm 61 are aligned to form a straight line extending in the left-right direction, and the second left-side support arm 52 and the second right-side support arm 62 are aligned to form a straight line extending in the left-right direction. Further, a distal end part that is the right end part of the first left-side support arm 51 reaches to the middle between the left-side frame 20 and the right-side frame 30 in the left-right direction, and a distal end part that is the left end part of the first right-side support arm 61 also reaches to the middle between the left-side frame 20 and the right-side frame 30.

On the other hand, as illustrated in FIG. 5 and FIG. 6, the distance between the left-side frame 20 and the right-side frame 30 can be narrowed, thus folding the wheelchair body 2, by: pivoting the first left-side support arm 51 about the coupling shaft 51*a* so that the distal end part (other end part) moves to the rear; pivoting the first right-side support arm 61 about the coupling shaft 61*a* so that the distal end part (other end part) moves to the rear; pivoting the second left-side support arm 52 about the coupling shaft 52*a* so that the distal end part (other end part) moves to the rear; and pivoting the second right-side support arm 62 about the coupling shaft 62*a* so that the distal end part (other end part) moves to the rear. During the folded state, the first left-side support arm 51 and the first right-side support arm 61 take a posture that extends in the front-rear direction, and the second left-side support arm 52 and the second right-side support arm 62 take a posture that extends in the front-rear direction. While the present embodiment deals with a case where the first left-side support arm 51 and the first right-side support arm 61 aligned in the left-right direction, and are parallel to each other, the present invention is not limited to this, and the first left-side support arm 51 and the first right-side support arm 61 does not have to be parallel to each other, and may be arranged so that the distance between the support arms 51, 61 is widened as it goes toward the based end. The similar applies to the second left-side support arm 52 and the second right-side support arm 62. Note that, at the time of folding, the left-side rest arm 41 and the right-side rest arm 42 of the foot rest part 40 are pivoted upward, and a folding operation of the foot rest part 40 is performed at the same time.

Note that the left-side support arms 51, 52 and the right-side support arms 61, 62 are configured so as not to pivot forward from their positions in the unfolded state. That is, as illustrated in FIG. 11, when an attempt is made to pivot forward the first left-side support arm 51 from its position in the unfolded state, an edge part 51*b* on the base end side of the first left-side support arm 51 contacts the upper frame part 21, thus inhibiting pivoting of the first left-side support arm 51 forward. The second left-side support arm 52 is also inhibited from pivoting forward by an edge part 52*b*. Further, the first right-side support arm 61 is also inhibited from pivoting forward by an edge part 61*b*. Further, the second right-side support arm 62 is also inhibited from pivoting forward by an edge part 62*b*. The configuration for inhibiting the forward pivoting is not limited to the one described above, and another configuration, such as a configuration including a stopper or the like, is also possible.

(Folding Mechanism)

Figure 12:
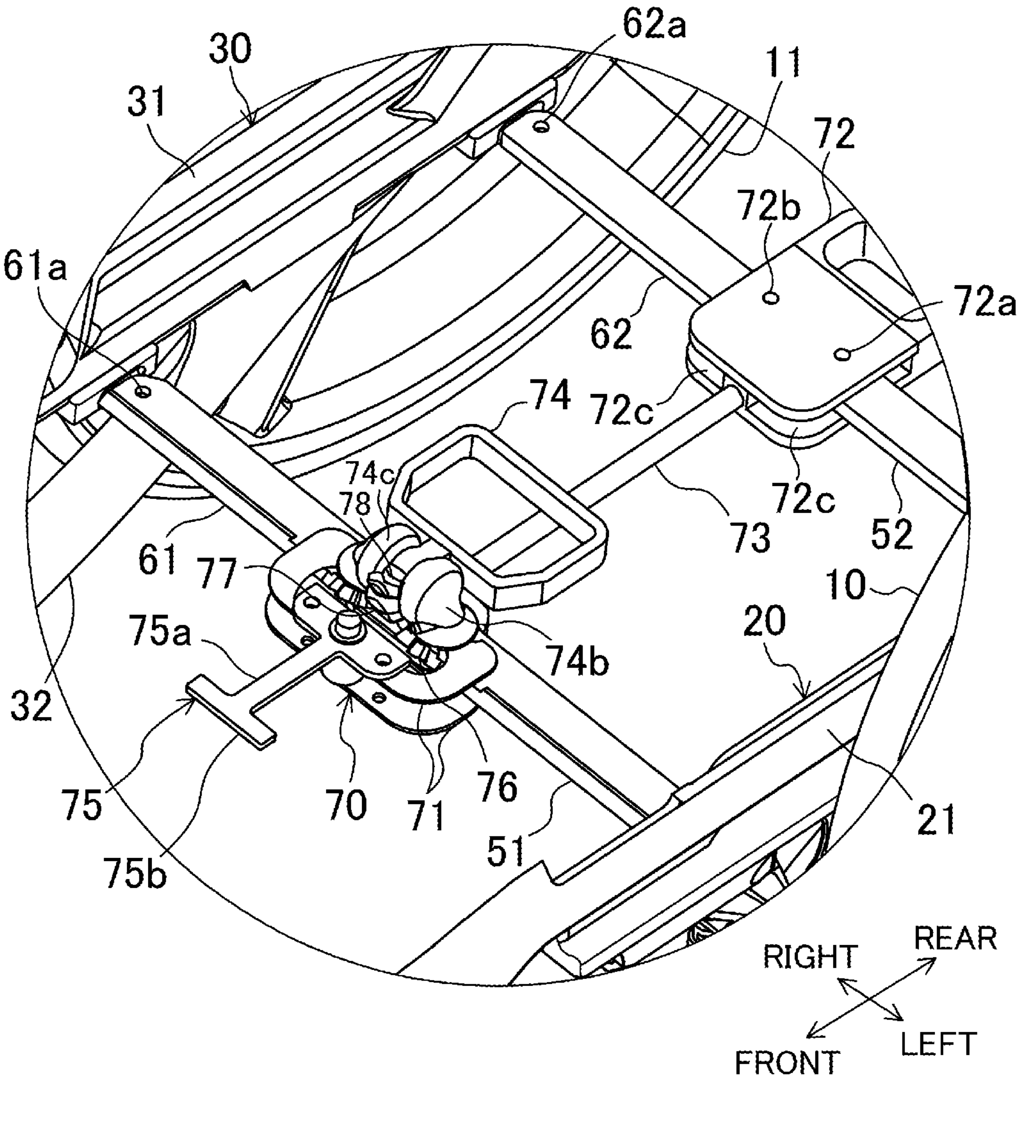
FIG. 12 is a perspective view of the support arms and the folding mechanism as viewed from the upper left side.

Next, the following describes the configuration of the folding mechanism 70 illustrated in FIG. 11, FIG. 12, and the like. The folding mechanism 70 is arranged between the left-side frame 20 and the right-side frame 30, and couples the first left-side support arm 51 and the first right-side support arm 61 in such a manner that the first left-side support arm 51 and the first right-side support arm 61 are foldable in the left-right direction, while coupling the second left-side support arm 52 and the second right-side support arm 62 in such a manner that the second left-side support arm 52 and the second right-side support arm 62 are foldable in the left-right direction. Specifically, the folding mechanism 70 includes a front-side coupling member 71, a rear-side coupling member 72, an interlocking member 73, an operation part 74, a grip part 75, and a left-side driven gear part (first gear part) 76, a right-side driven gear part (first gear part) 77, and a driving gear part (second gear part) 78. Only one of the left-side driven gear part 76 or the right-side driven gear part 77 may be provided. In the following, each member constituting the folding mechanism 70 will be described in detail.

(Driven Gear Part)

Figure 13:
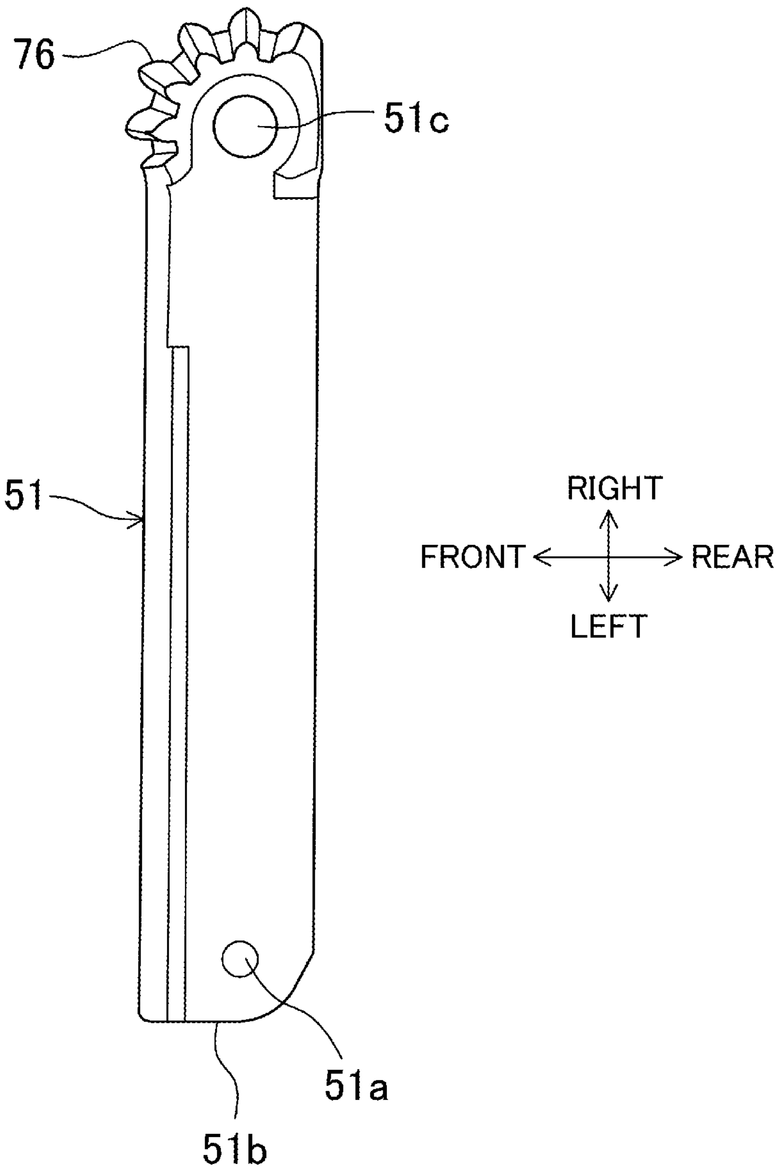
FIG. 13 is a plan view of a first left-side support arm.

As illustrated in FIG. 13, the left-side driven gear part 76 is arranged integrally with the distal end part of the first left-side support arm 51, so that the first left-side support arm 51 and the left-side driven gear part 76 do not pivot relatively to each other. In the distal end part of the first left-side support arm 51, a support shaft 51*c* extending in the upward-downward direction is provided so as to penetrate the distal end part. The support shaft 51*c* is kept from coming off from the distal end part of the first left-side support arm 51. A plurality of teeth constituting the left-side driven gear part 76 are aligned so as to draw an arc-shaped path about the support shaft 51*c* at the distal end part of the first left-side support arm 51. Therefore, the rotational center line of the left-side driven gear part 76 extends in the upward-downward direction.

Similarly, as illustrated in FIG. 11, a plurality of teeth constituting the right-side driven gear part 77 are aligned so as to draw an arc-shaped path about a support shaft 61*c* that is kept from coming off from the distal end part of the first right-side support arm 61. Therefore, the rotational center line of the right-side driven gear part 77 also extends in the upward-downward direction. The rotational center lines of the left-side driven gear part 76 and the right-side driven gear part 77 are parallel to the coupling shaft 51*a*.

The left-side driven gear part 76 and the right-side driven gear part 77 are arranged in the left-right direction with a predetermined distance therebetween. The number of teeth of the left-side driven gear part 76 is the same as the number of teeth of the right-side driven gear part 77.

(Coupling Members)

As illustrated in FIG. 12, the front-side coupling member 71 is made of a plate extended in the left-right direction, and two identical front-side coupling members 71 are provided, one at the tope and one at the bottom, with a distance there between. The distance between the front-side coupling members 71, 71 is set so as to accommodate the distal end sides of the first left-side support arm 51 and the first right-side support arm 61 between the front-side coupling members 71, 71. A front part of the front-side coupling members 71 is coupled to the grip part 75. Meanwhile, as illustrated in FIG. 11, the distal end part of the first left-side support arm 51 is coupled to a left-rear part of the front-side coupling member 71 by the support shaft 51*c*. Further, the distal end part of the first right-side support arm 61 is coupled to a right rear part of the front-side coupling member 71 by the support shaft 61*c*. The first left-side support arm 51 is pivotable about the support shaft 51*c*, and the first right-side support arm 61 is pivotable about the support shaft 61*c*. Thus, the distal end part of the first left-side support arm 51 and the distal end part of the first right-side support arm 61 are pivotably coupled to each other via the front-side coupling member 71, and the rear end part (base end part) of the grip part 75 is coupled to the distal end part of the first left-side support arm 51 and the distal end part of the first right-side support arm 61 via the front-side coupling member 71. The support shaft 61*c* is parallel to the coupling shaft 61*a*.

The rear-side coupling member 72 is arranged to the rear of the front-side coupling member 71, distanced from the same. The rear-side coupling member 72 has a thick plate shape extended in the front-rear direction and is coupled to the distal end part of the second left-side support arm 52 by a support shaft 72*a* extending in the upward-downward direction and to the distal end part of the second right-side support arm 62 by a support shaft 72*b*. The second left-side support arm 52 is pivotable about the support shaft 72*a*, and the second right-side support arm 62 is pivotable about the support shaft 72*b*. The rear-side coupling member 72 has a cavity part 72*c* that accommodates therein the distal end side of the second left-side support arm 52 and the distal end side of the second right-side support arm 62. The support shafts 72*a*, 72*b* are parallel to the coupling shaft 52*a*.

In a rear part of the rear-side coupling member 72, a ring part 72*d* formed in a ring shape is provided. The ring part 72*d* protrudes rearward from the second left-side support arm 52 and the second right-side support arm 62. This ring part 72*d* may be provided as needed, and may be omitted or have a different shape.

(Interlocking Member)

The interlocking member 73 is a member that couples the front-side coupling member 71 and the rear-side coupling member 72, and is formed in a rod shape extended in the front-rear direction. The rear end part of the interlocking member 73 is fixed to a front part of the rear-side coupling member 72, in the middle relative to the left-right direction. On the other hand, the front end part of the interlocking member 73 is coupled pivotably with respect to the support shaft 51*c* at the distal end part of the first left-side support arm 51 and to the support shaft 61*c* at the distal end part of the first right-side support arm 61. The distal end part of the first left-side support arm 51 and the distal end part of the first right-side support arm 61 are pivotable about the support shaft 51*c* and the support shaft 61*c*, respectively, with respect to the front end part of the interlocking member 73. Thus, the first left-side support arm 51 and the first right-side support arm 61 are coupled to and interlocked with the second left-side support arm 52 and the second right-side support arm 62 via the interlocking member 73.

(Operation Part and Driving Gear Part)

Figure 14:
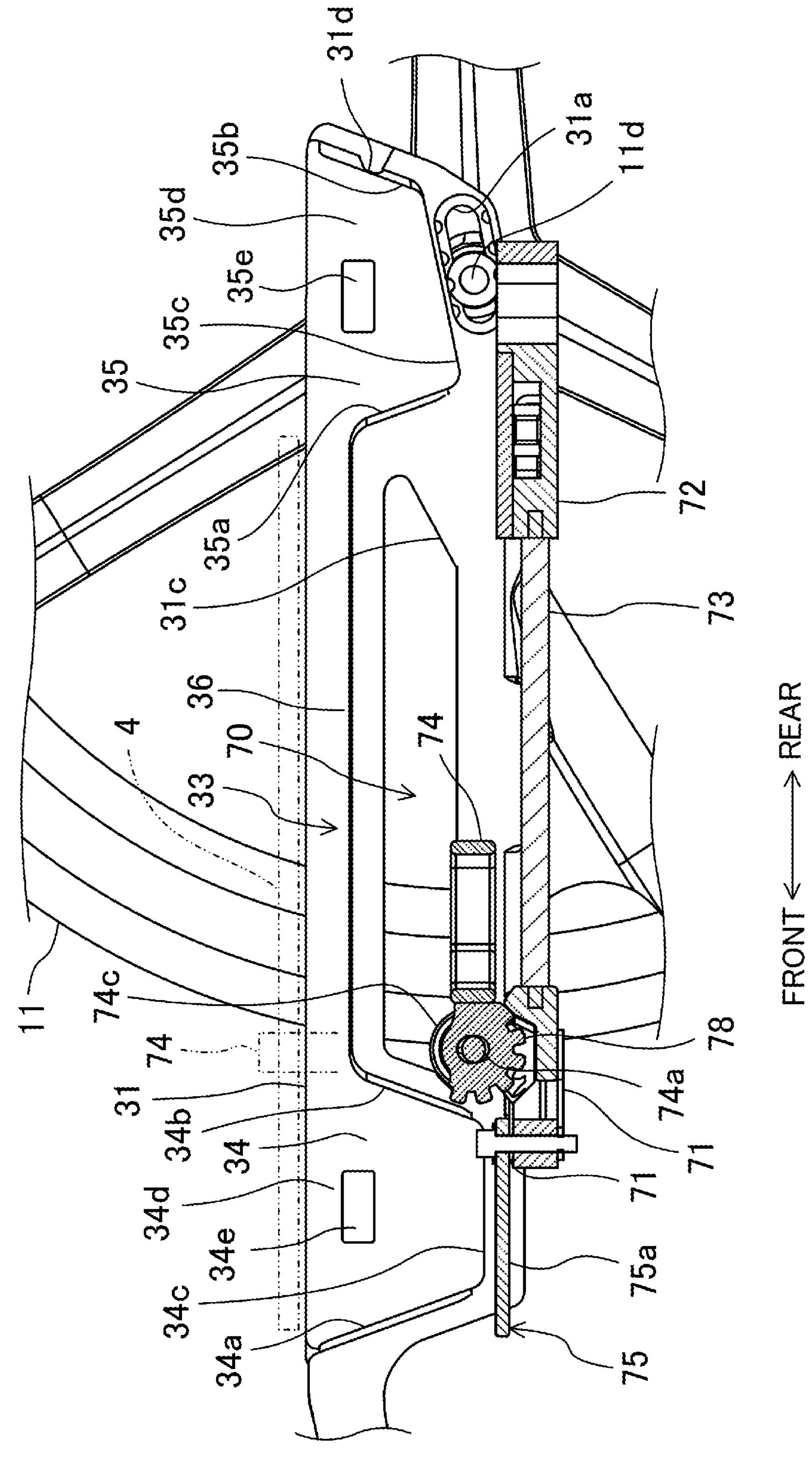
FIG. 14 is a cross-sectional view taken along line XIV-XIV in FIG. 11.
Figure 15:
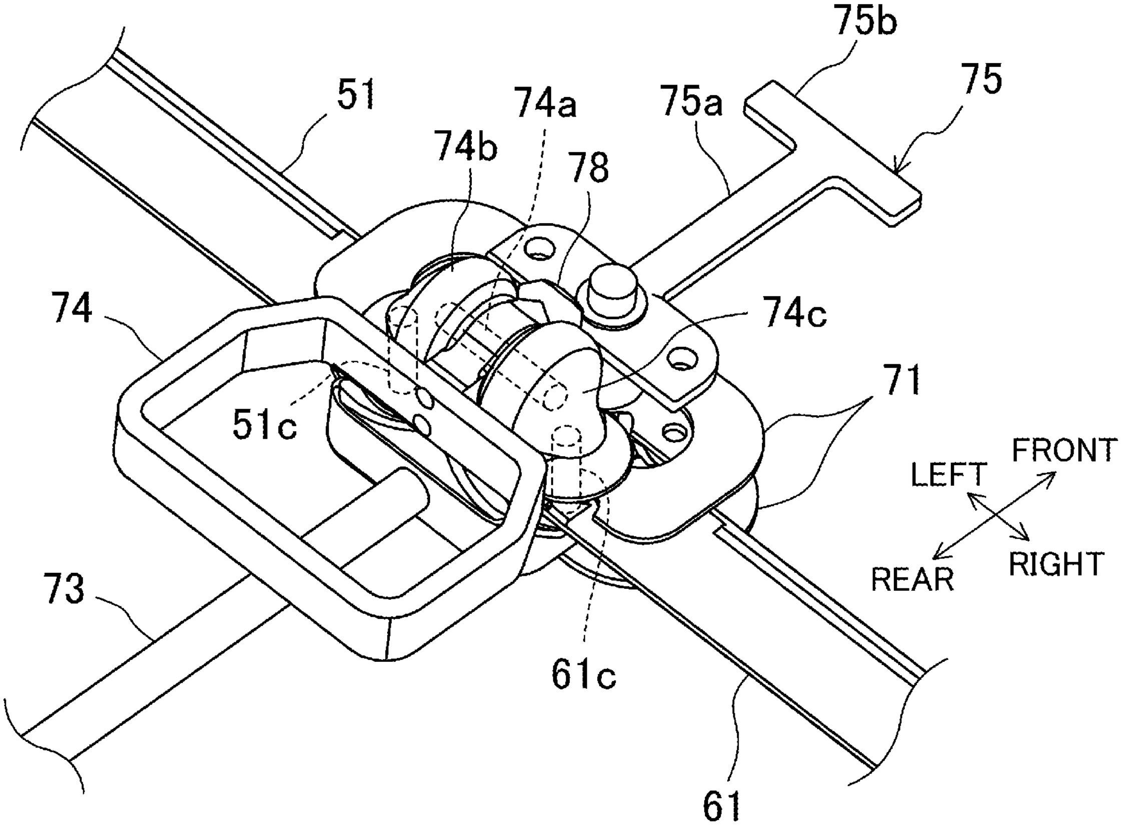
FIG. 15 is an enlarged perspective view of a vicinity of an operation part of the folding mechanism as viewed from the upper right side.

The operation part 74 is a member to manually operate the folding mechanism 70 by, for example, the wheelchair user or a helper who performs folding operation (operator), and is arranged in the middle relative to the left-right direction between the left-side frame 20 and the right-side frame 30. An operating direction of this operation part 74 is the upward-downward direction. That is, as illustrated in FIG. 14 and FIG. 15, a support shaft (support member) 74*a* penetrates the base end part of the operation part 74 in the left-right direction. With this support shaft 74*a* the operation part 74 is pivotably supported. The left end part of the support shaft 74*a* is supported by a left-side bearing unit 74*b* and the right end part of the support shaft 74*a* is supported by a right-side bearing unit 74*c*. The left-side bearing unit 74*b* is arranged on the left side of the upper surface of the front-side coupling member 71, and is integrated with the upper end part of the support shaft 51*c*. The right-side bearing unit 74*c* is arranged on the right side of the upper surface of the front-side coupling member 71, and is integrated with the upper end part of the support shaft 61*c*.

A part of the operation part 74 radially away from the support shaft 74*a* is formed in a ring shape. This enables the operator to insert his/her hand into the operation part 74 to grip the operation part 74 or hold the operation part 74. The size of the operation part 74 can be set to any size, and is set to a size that at least allows insertion of a finger in one preferred embodiment. The operation part 74 does not have to be formed in a ring shape, and may be formed in a rod shape. In the case of forming the operation part 74 in a rod shape, the operation part 74 has a part radially extending from the support shaft 74 and a part extending parallel to the support shaft 74*a* in one preferred embodiment.

As illustrated in FIG. 14, the driving gear part 78 is integrally provided to the base end part of the operation part 74, so that the driving gear part 78 and the base end part of the operation part 74 are kept from pivoting relatively to each other. A plurality of teeth constituting the driving gear part 78 are aligned so as to draw an arc-shaped path about the support shaft 74*a* at the base end part of the operation part 74. Therefore, the rotational center line of the driving gear part 78 extends in the left-right direction. Since the operation part 74 and the driving gear part 78 are integrated with each other, the driving gear part 78 can be driven about the support shaft 74*a* by operating the operation part 74 to pivot about the support shaft 74*a*. At this time, the operation part 74 pivots about the same rotational center line as that of the driving gear part 78. That is, the support shaft 74*a* is a member that supports the operation part 74 so that the operation part 74 can be operated and pivoted about the same rotational center line as that of the driving gear part 78.

The support shaft 74*a* is arranged above the first left-side support arm 51 and the first right-side support arm 61. Therefore, the rotational center line of the driving gear part 78 and the operation part 74 are arranged above the first left-side support arm 51 and the first right-side support arm 61. To operate the operation part 74, the operation part 74 is held by a hand from the above. Since the operation part 74 is positioned above the first left-side support arm 51 and the first right-side support arm 61, the first left-side support arm 51 and the first right-side support arm 61 do not obstacle the hand at the time of holding the operation part 74, which improves the operability.

The width (dimension in the left-right direction) of the teeth of the driving gear part 78 is set so as to reach the left-side driven gear part 76 and the right-side driven gear part 77. As a result, the teeth of the driving gear part 78 can be meshed with both the teeth of the left-side driven gear part 76 and the teeth of the right-side driven gear part 77. That is, a single driving gear part 78 can drive two driven gear parts 76, 77, which contributes to reduction of the number of parts. Further, it is possible to synchronize the pivot start timing and the pivoting speed between the driven gear parts 76, 77.

The rotational center line of the driving gear part 78 extends in the left-right direction, while the rotational center lines of the left-side driven gear part 76 and the right-side driven gear part 77 extend in the upward-downward direction. Even in such a case where the rotational center lines are perpendicularly crossing, smooth transmission of power is possible by arranging the rotational center line of the driving gear part 78 above the left-side driven gear part 76 and the right-side driven gear part 77.

(Folding and Unfolding Operations with Operation Part)

The folding mechanism 70 is configured to change the first left-side support arm 51 and the first right-side support arm 61, and the second left-side support arm 52 and the second right-side support arm 62 from the folded state to the unfolded state or from the unfolded state to the folded state through operation of the operation part 74. More specifically, the operation part 74 is capable of pivoting about the support shaft 74*a*. By supporting the operation part 74 pivotably about the support shaft 74*a*, the operation part 74 can be switched between an erected state (first operation state) in which the operation part 74 is erected upward as illustrated in FIG. 5 and FIG. 6, and an unerected state (second operation state) in which the operation part 74 is reclined as illustrated in FIG. 11, FIG. 12, and FIG. 14. In this embodiment, the operation part 74 in the erected state is switched to the unerected state by reclining the operation part 74 to the rear of the vehicle body. On the other hand, the operation part 74 in the unerected state is switched to the erected state by raising the operation part 74 toward the front of the vehicle body. The operation of reclining the operation part 74 toward the rear of the vehicle body is a downward operation, whereas the operation of raising the operation part 74 toward the front of the vehicle body is an upward operation. Note that, although illustration is omitted, the operation part 74 may be configured so as to be reclined toward the front of the vehicle body.

Through the operation of switching the unerected state of the operation part 74 to the erected state, the first left-side support arm 51 and the first right-side support arm 61 and the second left-side support arm 52 and the second right-side support arm 62 are changed from the unfolded state to the folded state. Further, through the operation of switching the erected state of the operation part 74 to the unerected state, the first left-side support arm 51 and the first right-side support arm 61 and the second left-side support arm 52 and the second right-side support arm 62 are changed from the folded state to the unfolded state.

More specifically, to switch the unerected state of the operation part 74 to the erected state, the operation part 74 is raised upward. This operation is an operation toward a predetermined direction. Since the operation part 74 is integrally provided with the driving gear part 78, operation of the operation part 74 in the predetermined direction causes the driving gear part 78 to rotate forward about the support shaft 74*a*. A rotational force of this rotation of the driving gear part 78 is transmitted to the left-side driven gear part 76 and the right-side driven gear part 77 meshed with the driving gear part 78, causing the left-side driven gear part 76 and the right-side driven gear part 77 to try to rotate about their rotational center lines extended in the upward-downward direction. At this time, the base end part of the first left-side support arm 51 integrally having the left-side driven gear part 76 is pivotable about the coupling shaft 51*a* with respect to the left-side frame 20. Further, the base end part of the first right-side support arm 61 integrally having the right-side driven gear part 77 is pivotable about the coupling shaft 61*a* with respect to the right-side frame 30. Further, the distal end part of the first left-side support arm 51 and the distal end part of the first right-side support arm 61 are both pivotable with respect to the front-side coupling member 71. Therefore, the rotational force transmitted to the left-side driven gear part 76 and the right-side driven gear part 77 causes the first left-side support arm 51 to pivot rearward about the coupling shaft 51*a* and causes the first right-side support arm 61 to pivot rearward about the coupling shaft 61*a*. Thus, the first left-side support arm 51 and the first right-side support arm 61 in the unfolded state are changed to the folded state.

Since the first left-side support arm 51 and the first right-side support arm 61 are coupled to the second left-side support arm 52 and the second right-side support arm 62 via the interlocking member 73, the second left-side support arm 52 and the second right-side support arm 62 also pivot similarly about the coupling shafts 52*a*, 62*a*, respectively, in conjunction with pivoting of the first left-side support arm 51 and the first right-side support arm 61. Thus, the second left-side support arm 52 and the second right-side support arm 62 in the unfolded state are changed to the folded state at the same time.

(Arrangement of Operation Part)

The following describes a case of lifting and carrying the wheelchair body 2 by one hand after folding the wheelchair body 2. Wheelchairs in general are not expected to be lifted by one hand in the first place. Therefore, in a case of lifting the wheelchair body 2 by one hand, it is hard to find where to hold. Even if the wheelchair is held by one hand, the wheelchair that is not expected to be held by one hand is likely to become unstable and is likely to end up being inclined with its front part lower than its rear part. Since traditional wheelchairs in general have pivotable casters as in the present embodiment in its front part, the casters hang down and contacts the ground when the front part of the wheelchair is lowered. For this reason, the wheelchair needs to be lifted to a higher position. In particular, suppose that the wheelchair user drives a motor vehicle alone. In this case, the wheelchair user needs to move the wheelchair outside the motor vehicle to the inside after the wheelchair user has moved from the wheelchair to the driver seat of the motor vehicle. At this time, it is difficult to lift the wheelchair with both hands, and there is no choice but to lift the wheelchair by one hand. Doing so, however, causes the casters to hand down and contact the lower edge part of the door opening, causing difficulty to stow the wheelchair inside. It is therefore necessary to lift the wheelchair to a higher position, which is a significant burden for the wheelchair user.

To address this, the position of the operation part 74 is devised in this embodiment. Namely, as indicated by a broken line in FIG. 4, the operation part 74 is arranged between the wheel shafts 10*d*, 11*d* of the driving wheels 10, 11 and the rotational center lines of the casters 12, 13, in a side view of the vehicle body. The center of gravity of the wheelchair body 2 with the seat 3 having been detached is in the vicinity of the wheel shafts 10*d*, 11*d* of the driving wheels 10, 11 in a side view. Therefore, holding the operation part 74 between the driving wheels 10, 11 and the casters 12, 13 in a side view after the wheelchair is folded causes the rear part of the wheelchair body 2 to be lower than the front part thereof. This inhibits the casters 12, 13 from hanging down.

(Grip Part)

As illustrated in FIG. 11 and FIG. 12, the grip part 75 constituting a part of the folding mechanism 70 is a part that can be held at a time of moving the folded wheelchair body 2. Although the operation part 74 may be held to lift the wheelchair body 2, the operation part 74 is in the erected state while the wheelchair body 2 is folded, and some people may find it difficult to hold the operation part 74. Further, it is imaginable that the operation part 74 in the ring shape could be hard to hold, and the operation part 74 is a member for operating the folding mechanism 70 in the first place and not a member exclusively for lifting the wheelchair body 2. To address this, the present embodiment provides the grip part 75 separately from the operation part 74 to facilitate lifting of the wheelchair body 2. Note that the grip part 75 may be omitted and the wheelchair body 2 may be lifted by holding the operation part 74.

The grip part 75 is attached to the front part of the front-side coupling member 71, and is coupled to the first left-side support arm 51 and the first right-side support arm 61 via the front-side coupling member 71. The grip part 75 extends forward from the front part of the front-side coupling member 71. That is, while the first left-side support arm 51 and the first right-side support arm 61 are in the folded state as illustrated in FIG. 5 and FIG. 6, the distal end parts of the support arms 51, 61 are positioned rearward as compared to their base end parts. To change the first left-side support arm 51 and the first right-side support arm 61 in the folded state to the unfolded state, the first left-side support arm 51 and the first right-side support arm 61 are pivoted forward about the coupling shafts 51*a*, 61*a* by operating the operation part 74. That is, the forward is the pivoting direction at the time of the changing the first left-side support arm 51 and the first right-side support arm 61 in the folded state to the unfolded state.

The grip part 75 can be used at the time of changing the wheelchair body 2 in the folded state to the unfolded state. When the wheelchair user holds the grip part 75 and makes a movement to lift the wheelchair body 2, the grip part 75 coupled to both the first left-side support arm 51 and the first right-side support arm 61 moves relatively upward, because the first left-side support arm 51 and the first right-side support arm 61 are pivotably coupled to the left-side frame 20 and the right-side frame 30, respectively, while a gravity-attributed downward force constantly acts on the left-side frame 20 and the right-side frame 30. Due to this relative movement of the grip part 75, the first left-side support arm 51 and the first right-side support arm 61 pivot forward until their folded state changes to the unfolded state. Since the grip part 75 extends forward which is the pivoting direction of both support arms 51, 61 at the time of changing from the folded state to the unfolded state, simply holding the grip part 75 and making a motion of lifting up unfold the wheelchair body 2 due to the weight of the wheelchair body 2 itself. To unfold by holding the grip part 75, there is no need for operating the operation part 74.

The shape and configuration of the grip part 75 are not particularly limited. In this embodiment, however, the grip part 75 is configured by a plurality of parts extending in different directions. Specifically, the grip part 75 includes a first grip part 75*a* linearly extended in the pivoting direction of the first left-side support arm 51 and the first right-side support arm 61 from a base end part (rear end part) coupled to the first left-side support arm 51 and the first right-side support arm 61, and a second grip part 75*b* extended in the left-right direction of the vehicle body from the distal end part of the first grip part 75*a*. The second grip part 75*b* may extend in both the left and right directions, or may extend only in one direction. Since the directions in which the first grip part 75*a* and the second grip part 75*b* extend are different from each other, the wheelchair user can select and hold the one he/she finds it easier to hold.

(Configuration of Seat)

As illustrated in FIG. 2, the seat 3 includes the seat cushion part 4 on which the wheelchair user is seated, the back cushion part 5, and a seat frame 7. As illustrated in FIG. 1, the seat frame 7 is detachably attachable to the left-side frame 20 and the right-side frame 30 of the wheelchair body 2. As illustrated in FIG. 3, the seat frame 7 includes the left-side seat frame member 90, a right-side seat frame member 91, and a seat back frame 92. As illustrated in FIG. 1, the left-side seat frame member 90 extends in the front-rear direction on the left side of the lower part of the seat 3, along the upper frame part 21 of the left-side frame 20 of the wheelchair body 2. The right-side seat frame member 91 extends in the front-rear direction on the right side of the lower part of the seat 3, along the upper frame part 31 of the right-side frame 30 of the wheelchair body 2. Note that the operation part 74 and the grip part 75 of the folding mechanism 70 are arranged between the left-side seat frame member 90 and the right-side seat frame member 91 in a plan view.

As illustrated by the virtual line in FIG. 3, the seat cushion part 4 constituting a seating surface for the wheelchair user to sit thereon extends from the left-side seat frame member 90 to the right-side seat frame member 91, and also extends in the front-rear direction. The left side of the seat cushion part 4 is supported by the left-side seat frame member 90, and the right side of the seat cushion part 4 is supported by the right-side seat frame member 91. Examples of a member constituting the seat cushion part 4 include a plate material, a cloth material, a net-like member, various elastic materials, and a foam material. The seat cushion part 4 can be a member that can elastically deform downward when the wheelchair user sits thereon.

While the seat 3 is attached to the wheelchair body 2, the seat cushion part 4 is arranged above the operation part 74 of the folding mechanism 70. In other words, the operation part 74 is arranged directly below the seat cushion part 4. For example, the seat cushion part 4 indicated by the virtual line in FIG. 14 and the operation part 74 are apart from each other in the upward-downward direction, with a space formed therebetween. Such a relative positional relationship between the seat cushion part 4 and the operation part 74 can be established by the structure and shape of the seat frame 7.

Specifically, the heights of the upper end parts of the seat frame members 90, 91 and the dimension of the seat frame members 90, 91 in the upward-downward direction are set so that the upper end part of the operation part 74 in the unerected state in a side view and the upper end parts of the seat frame members 90, 91 are distanced by at least a predetermined distance. This way, the operation part 74 in the unerected state in a side view is at least a predetermined distance below from the upper end part of the seat frame members 90, 91, and as the result, the above-mentioned space is formed between the seat cushion part 4 and the operation part 74.

Here, when the wheelchair user sits on the seat cushion part 4, the seat cushion part 4 sinks due to the weight of the wheelchair user. Since the operation part 74 is arranged at least a predetermined distance below the upper end parts of the seat frame members 90, 91 supporting the seat cushion part 4 in a side view, the operation part 74 does not contact the seat cushion part 4 having sunk. Thus, since the operation part 74 does not contact a part of the seat cushion part 4 corresponding to the legs or the buttocks of the wheelchair user, the wheelchair user does not feel awkwardness, and riding comfort is improved.

Note that the sinking amount of the seat cushion part 4 when the wheelchair user sits thereon increases with an increase in the weight of the wheelchair user. However, since the operation part 74 is arranged at least a predetermined distance below the upper end parts of the seat frame members 90, 91 as the reference, the seat cushion part 4 is kept from contacting the operation part 74 even if the seat cushion part 4 sinks due to a heavy wheelchair user sitting thereon. That is, the above-mentioned predetermined distance is set to such a value that the seat cushion part 4 is kept from contacting the operation part 74 even when the maximum load assumed for the wheelchair acts on the seat cushion part 4. The maximum load assumed for the wheelchair can be set to any load. For example, the maximum load is a load in cases where a wheelchair user of 100 kg or 120 kg in his/her body weight is seated. The sinking amount of the seat cushion part 4 at this time can be referred to as a maximum sinking amount. Even when the sinking amount of the seat cushion part 4 is the maximum sinking amount, the lower surface of the seat cushion part 4 does not contact the operation part 74. The above-mentioned predetermined distance may be changed according to the material, configuration, and the like of the seat cushion part 4, because the sinking amount may be different depending on the material, configuration, and the like of the seat cushion part 4.

The dimension of the operation part 74 and the height of the support shaft 74*a* are set so that the upper end part of the operation part 74 is in a position higher than the upper end parts of the seat frame members 90, 91, while the operation part 74 is brought into the erected state as illustrated by the virtual line in FIG. 14.

Further, while the seat 3 is attached to the wheelchair body 2, the grip part 75 is positioned below the seat cushion part 4. Therefore, the grip part 75 is hidden under the seat cushion part 4, which reduces the risk of the wheelchair user or the helper inadvertently gripping the grip part 75. On the other hand, since the seat 3 is detached in an occasion of folding and holding the wheelchair body 2, the grip part 75 can be seen from the above and the grip part 75 can be easily held.

(Fitting Configuration of Seat Frame and Wheelchair Body)

In this embodiment, at a time of attaching the seat 3 to the wheelchair body 2, the seat frame 7 can be fit to the left-side frame 20 and the right-side frame 20 by placing both the left and right ends of the seat frame 7 on the left-side frame 20 and the right-side frame 20 of the wheelchair body 2. Such a configuration of fitting suppresses rattling of the seat 3. The following specifically describes the configuration of fitting the seat frame 7 to the wheelchair body 2.

As illustrated in FIG. 3, on the front side of the left-side seat frame member 90, there is provided a first left-side engagement protrusion 93 that protrudes downward. On the rear side of the left-side seat frame member 90, there is provided a second left-side engagement protrusion 94. The distance, in the front-rear direction, between the first left-side engagement protrusion 93 and the second left-side engagement protrusion 94 matches with the distance, in the front-rear direction, between the front-side accommodation recess 24 and the rear-side accommodation recess 25 (illustrated in FIG. 7) formed on the left-side frame 20. At a time of attaching the seat 3, the first left-side engagement protrusion 93 and the second left-side engagement protrusion 94 are positioned above the front-side accommodation recess 24 and the rear-side accommodation recess 25 and then moved downward to insert the first left-side engagement protrusion 93 and the second left-side engagement protrusion 94, from above, into the front-side accommodation recess 24 and the rear-side accommodation recess 25. Therefore, the first left-side engagement protrusion 93 and the second left-side engagement protrusion 94 are parts that are inserted into the front-side accommodation recess 24 and the rear-side accommodation recess 25 from above and engages with them, respectively. Further, a part between the first left-side engagement protrusion 93 and the second left-side engagement protrusion 94 of the left-side seat frame member 90 is accommodated in the intermediate accommodation recess 26 formed in the left-side frame 20.

The first left-side engagement protrusion 93 is formed in a hollowed shape, and the hollowed part is open to the left. A front surface 93*a* and a rear surface 93*b* on the front side and the rear side of the outer surface of the first left-side engagement protrusion 93 are formed so as to extend along the front-side engagement surface 24*a* and the rear-side engagement surface 24*b* of the front-side accommodation recess 24. Therefore, the dimension of the first left-side engagement protrusion 93 in the front-rear direction is shortened toward the lower side. The lower surface of the first left-side engagement protrusion 93 is formed so as to extend along the bottom surface 24*c* of the front-side accommodation recess 24.

The second left-side engagement protrusion 94 is also formed in a hollowed shape that is open to the left. A front surface 94*a* and a rear surface 94*b* on the front side and the rear side of the outer surface of the second left-side engagement protrusion 94 are formed so as to extend along the front-side engagement surface 25*a* and the rear-side engagement surface 25*b* of the rear-side accommodation recess 25. Therefore, the dimension of the second left-side engagement protrusion 94 in the front-rear direction is shortened toward the lower side. The lower surface of the second left-side engagement protrusion 94 is formed so as to extend along the bottom surface 25*c* of the rear-side accommodation recess 25.

The right-side seat frame member 91 is also provided with a first right-side engagement protrusion 95 and a second right-side engagement protrusion 96 that protrude downward, similarly to the left-side seat frame member 90. The distance, in the front-rear direction, between the first right-side engagement protrusion 95 and the second right-side engagement protrusion 96 matches with the distance, in the front-rear direction, between the front-side accommodation recess 34 and the rear-side accommodation recess 35 formed on the right-side frame 30. At a time of attaching the seat 3, the first right-side engagement protrusion 95 and the second right-side engagement protrusion 96 are inserted from above into the front-side accommodation recess 34 and the rear-side accommodation recess 35. Further, a part between the first right-side engagement protrusion 95 and the second right-side engagement protrusion 96 of the right-side seat frame member 91 is accommodated in the intermediate accommodation recess 36 formed in the right-side frame 30.

The first right-side engagement protrusion 95 is formed in a hollowed shape that is open to the right. A front surface 95*a* and a rear surface 95*b* of the first right-side engagement protrusion 95 are formed so as to extend along the front-side engagement surface 34*a* and the rear-side engagement surface 34*b* of the front-side accommodation recess 34. Therefore, the dimension of the first right-side engagement protrusion 95 in the front-rear direction is shortened toward the lower side. The lower surface of the first right-side engagement protrusion 95 is formed so as to extend along the bottom surface 34*c* of the front-side accommodation recess 34.

The second right-side engagement protrusion 96 is also formed in a hollowed shape that is open to the right. A front surface 96*a* and a rear surface 96*b* of the second right-side engagement protrusion 96 are formed so as to extend along the front-side engagement surface 35*a* and the rear-side engagement surface 35*b* of the front-side accommodation recess 35. Therefore, the dimension of the second right-side engagement protrusion 96 in the front-rear direction is shortened toward the lower side. The lower surface of the second right-side engagement protrusion 96 is formed so as to extend along the bottom surface 35*c* of the front-side accommodation recess 35.

In the above-described configuration, the seat 3 can be attached to the wheelchair body 2 simply by moving the seat frame 7 downward so as to insert from above the left-side engagement protrusions 93, 94 and the right-side engagement protrusions 95, 96 into the left-side accommodation recesses 24, 25 and the right-side accommodation recesses 34, 35, respectively. Therefore, the operation for attachment is easy. At the time of attaching operation, since the dimensions in the front-rear direction of the lower surfaces of the left-side engagement protrusions 93, 94 are shorter than the dimensions in the front-rear direction of the upper end parts of the left-side accommodation recesses 24, 25, positioning of the left-side engagement protrusions 93, 94 and the left-side accommodation recesses 24, 25 is easily done. The similar applies to the right-side engagement protrusions 95, 96.

By inserting the left-side engagement protrusions 93, 94 and the right-side engagement protrusions 95, 96 into the left-side accommodation recesses 24, 25 and the right-side accommodation recesses 34, 35 and engage them with each other, the seat frame 7 can be fit to the left-side frame 20 and the right-side frame 20. At this time, since the front-side engagement surfaces 24*a*, 25*a* and the rear-side engagement surfaces 24*b*, 25*b* of the left-side accommodation recesses 24, 25, the front-side engagement surfaces 34*a*, 35*a* and the rear-side engagement surface 34*b*, 35*b* of the right-side accommodation recesses 34, 35 are each formed so as to be closer to the corresponding counterpart as it goes to the lower side, the seat frame 7 can be easily positioned at the time of attachment operation, without seeing the engagement protrusions 93 to 96 and the accommodation recesses 24, 25, 34, 35. Note that the seat frame 7 can also be easily detached as it only requires to lifting up the seat frame 7.

Further, the weight of the wheelchair user pushes the left-side engagement protrusions 93, 94 and the right-side engagement protrusions 95, 96 of the seat frame 7 downward, when the wheelchair user sits on the seat cushion part 4. As a result, the left-side engagement protrusions 93, 94 firmly contact the front-side engagement surfaces 24*a*, 25*a* and the rear-side engagement surfaces 24*b*, 25*b* of the left-side accommodation recesses 24, 25 and tightly fit into the left-side accommodation recesses 24, 25. Further, the right-side engagement protrusions 95, 96 firmly contact the front-side engagement surfaces 34*a*, 35*a* and the rear-side engagement surface 34*b*, 35*b* of the right-side accommodation recesses 34, 35 and tightly fit into the right-side accommodation recesses 34, 35.

The seat frame 7 includes a front-side cross beam 97 and a rear-side cross beam 98 extended in the left-right direction below the seat cushion part 4. The front-side cross beam 97 extends from the right-side surface of the first left-side engagement protrusion 93 to the left-side surface of the first right-side engagement protrusion 95, and is coupled to the first left-side engagement protrusion 93 and the first right-side engagement protrusion 95. Further, the rear-side cross beam 98 extends from the right-side surface of the second left-side engagement protrusion 94 to the left-side surface of the second right-side engagement protrusion 96, and is coupled to the second left-side engagement protrusion 94 and the second right-side engagement protrusion 96. This embodiment deals with a case where the left-side seat frame member 90, the right-side seat frame member 91, the front-side cross beam 97, and the rear-side cross beam 98 are integrally formed by the above-mentioned CFRP or the like; however, the present invention is not limited to this, and these parts may be separately formed and then combined into a single member.

With the front-side cross beam 97 and the rear-side cross beam 98, not only is it possible to improve the rigidity of the seat frame 7 but also the rigidity of the wheelchair body 2 can be improved by indirect coupling of the left-side frame 20 and the right-side frame 30 of the wheelchair body 2 via the cross beams 97, 98 of the seat frame 7. Especially, by combining and integrating the left-side engagement protrusions 93, 94 fit to the left-side frame 20 with the right-side engagement protrusions 95, 96 fit to the right-side frame 30, the improved rigidity effect of the wheelchair body 2 becomes further remarkable.

(Seat Folding Configuration)

The seat 3 is configured to be foldable by folding down the part to serve as the backrest. That is, the seat back frame 92 is attached to the rear end parts of the left-side seat frame member 90 and the right-side seat frame member 91 so as to be pivotable about a rotational center line extended in the left-right direction, and is a member capable of supporting the back of the wheelchair user during the erected state.

Specifically, the seat back frame 92 includes a left-side rod member 80 and a right-side rod member 81 that are arranged so as to extend in the upward-downward direction during the erected state, and a coupling rod member 82 that couples intermediate parts of the left-side rod member 80 and the right-side rod member 81. To the left-side rod member 80 and the right-side rod member 81, the back cushion part 5 made of a material similar to the seat cushion part 4 is attached. While the seat back frame 92 is folded, the left-side rod member 80 and the right-side rod member 81 extend forward and are positioned above the seat cushion part 4. Thus, the seat 3 can be made compact.

As the folding configuration of the seat back frame 92, a traditionally known configuration can be adopted. In this embodiment, the left-side rod member 80 has a left-side angle changer 83. The left-side angle changer 83 is arranged at the lower end part of the left-side rod member 80 and is coupled to the rear end part of the left-side seat frame member 90. Further, the right-side rod member 81 has a right-side angle changer 84. The right-side angle changer 84 is arranged at the lower end part of the right-side rod member 81 and is coupled to the rear end part of the right-side seat frame member 91.

The right-side angle changer 84 includes a fixed member 84*a* fixed to the rear end part of the right-side seat frame member 91, and a pivotable member 84*b* fixed to the lower end part of the right-side rod member 81 so as to be pivotable with respect to the fixed member 84*a*, about the rotational center line extending in the left-right direction, and a lock pin 84*c*. The lock pin 84*c* is inserted into a lock hole (not shown) formed in the fixed member 84*a* and into one of a first through hole or a second through hole (both not shown) formed in the pivotable member 84*b*. The first through hole and the second through hole of the pivotable member 84*b* are arranged distanced from each other, in the circumferential direction of the pivotal center line of the seat back frame 92. The positions of the first through hole and the second through hole are set so that, for example, the seat back frame 92 can be maintained in the erected state by inserting the lock pin 84*c* into the first through hole of the pivotable member 84*b* and the lock hole of the fixed member 84*a*, while the seat back frame 92 can be maintained in the folded state by inserting the lock pin 84*c* into the second through hole of the pivotable member 84*b* and the lock hole of the fixed member 84*a*.

The left-side angle changer 83 also includes a fixing member 83*a*, a pivotable member 83*b*, and a lock pin (not shown), similarly to the right-side angle changer 84. Further, the lock pin 84*c* of the right-side angle changer 84 and the lock pin of the left-side angle changer 83 are coupled to each other via a lock pin coupler 85. For example, pulling the lock pin coupler 85 can pull out the lock pin 84*c* of the right-side angle changer 84 and the lock pin of the left-side angle changer 83 from the lock holes, thus releasing the locked state.

The pivotable member 83*b* of the left-side angle changer 83 is provided with a left-side engagement part 83*d* that fits in and engages with the rear-side recess 21*d* of the left-side frame 20 while the seat back frame 92 is in the erected state. Similarly, the pivotable member 84*b* of the right-side angle changer 84 is provided with a right-side engagement part 84*d* that fits in and engages with the rear-side recess 31*d* of the right-side frame 30 while the seat back frame 92 is in the erected state. While the seat back frame 92 is folded, the left-side engagement part 83*d* and the right-side engagement part 84*d* moves upward and are out of the rear-side recess 21*d* of the left-side frame 20 and the rear-side recess 31*d* of the right-side frame 30.

Further, the pivotable member 83*b* of the left-side angle changer 83 has a left-side pushing part 83*e* that pushes a later-described left-side slide member 113 to a lock position when the seat back frame 92 is turned to the erected state. The left-side pushing part 83*e* and the left-side engagement part 83*d* are integrated with each other. Further, the pivotable member 84*b* of the right-side angle changer 84 has a right-side pushing part 84*e* that pushes a later-described right-side slide member 103 (illustrated in FIG. 17 and the like) to a lock position when the seat back frame 92 is turned to the erected state. The right-side pushing part 84*e* and the right-side engagement part 84*d* are integrated with each other. When the seat back frame 92 is folded, the left-side pushing part 83*e* and the right-side pushing part 84*e* are moved upward and separated upward from the left-side slide member 113 and the right-side slide member 103, respectively. On the other hand, when the seat back frame 92 is turned to the erected state, the left-side pushing part 83*e* and the right-side pushing part 84*e* push forward the left-side slide member 113 and the right-side slide member 103 with a predetermined force or more, respectively.

(Lock Configuration of Seat to Wheelchair Body)

Figure 17:
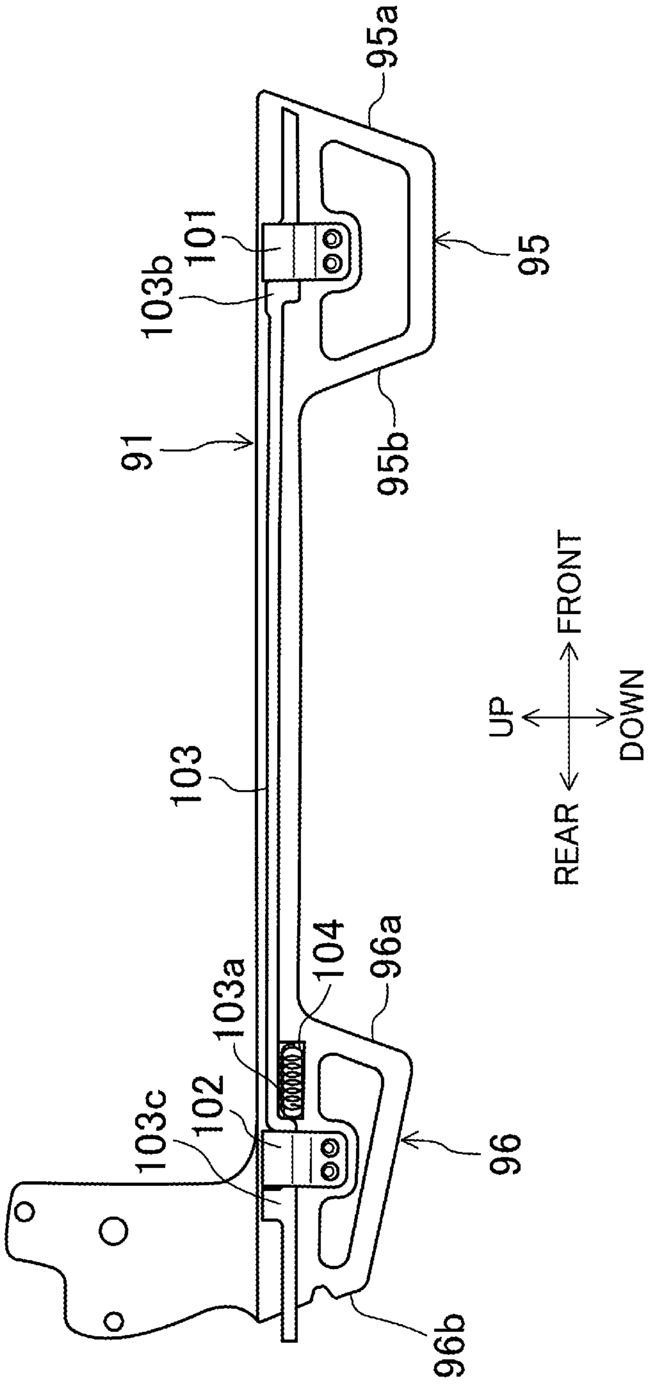
FIG. 17 is a right side view of a right-side seat frame member.

The seat 3 includes a lock configuration that keeps the seat 3 in a state of being attached to the wheelchair body 2 and restrict the seat 3 from easily detached from the wheelchair body 2. As illustrated in FIG. 17, the right-side seat frame member 91 includes a first right-side lock member 101, a second right-side lock member 102, the single right-side slide member 103, and a right-side coil spring (biasing member) 104. The first right-side lock member 101 and the second right-side lock member 102 are identical to each other and are made of, for example, an elastic metal plate material, a resin material, or the like.

The first right-side lock member 101 is arranged on the front side of the right-side surface of the right-side seat frame member 91 and is positioned to overlap the recessed part 34*e* (illustrated in FIG. 10) formed in the front-side accommodation recess 34 of the right-side frame 30, in a side view. In a side view, the first right-side lock member 101 and the front-side cross beam 97 overlap each other.

Further, the second right-side lock member 102 is arranged on the rear side of the right-side surface of the right-side seat frame member 91 and is positioned to overlap the recessed part 35*e* (illustrated in FIG. 9) formed in the rear-side accommodation recess 35 of the right-side frame 30, in a side view. In a side view, the second right-side lock member 102 and the rear-side cross beam 98 overlap each other.

While the lower part of the first right-side lock member 101 is a fixed end fixed to the right-side surface of the right-side seat frame member 91, the upper part is a free. Thus, the first right-side lock member 101 is flexibly deformable in the left-right direction. The middle part of the first right-side lock member 101 in the upward-downward direction is a part that enters the recessed part 34*e* and protrudes rightward as compared to the upper part and the lower part. Pushing the first right-side lock member 101 rightward with a predetermined force or more maintains a state in which the middle part of the first right-side lock member 101 protrudes from the right-side surface of the right-side seat frame member 91 toward the right side of the right-side seat frame member 91 and enters the recessed part 34*e*. The first right-side lock member 101 is formed as described above. With the middle part of the first right-side lock member 101 in the recessed part 34*e*, the middle part contacts and engages with the inner surface of the recessed part 34*e* to keep the middle part from coming off. Therefore, this state of the middle part protruding is the locked state. As described, since the recessed part 34*e* to serve as the engaged part is provided to a part of the right-side frame 30 corresponding to the first right-side lock member 101, the locked state is achievable simply by forming the first right-side lock member 101 in the shape as hereinabove described.

On the other hand, a state in which the first right-side lock member 101 is movable toward the inside of the right-side seat frame member 91 is the unlocked state. In the unlocked state, the first right-side lock member 101 is elastically deformable toward the left. For example, when the seat frame 7 is lifted upward while the wheelchair body 2 is placed, the first right-side lock member 101 slides on the inner surface of the recessed part 34*e* and pushed leftward to be elastically deformed toward the left. This way, the first right-side lock member 101 comes out of the recessed part 34*e*. Once the first right-side lock member 101 is out of the recessed part 34*e*, the shape of the first right-side lock member 101 is restored.

Similarly to the first right-side lock member 101, the lower part of the second right-side lock member 102 is a fixed end and the upper part of the same is a free end. The middle part of the second right-side lock member 102 enters and engaged with the recessed part 35*e*. On the other hand, when the second right-side lock member 102 is in the unlocked state, the middle part of the second right-side lock member 102 can exit the recessed part 35*e*.

As illustrated in FIG. 17, the right-side slide member 103 and the right-side coil spring 104 are accommodated in the right-side seat frame member 91. The right-side slide member 103 is formed in a rod-like shape long in the front-rear direction and arranged to the left of the first right-side lock member 101 and the second right-side lock member 102 in the right-side seat frame member 91, and is maintained slidable in the front-rear direction in the right-side seat frame member 91. The right-side slide member 103 is movably guided only in the front-rear direction by the right-side seat frame member 91. The right-side slide member 103 is slidable between a lock position that maintains the locked state of the first right-side lock member 101 and the second right-side lock member 102, and the unlock position that brings the first right-side lock member 101 and the second right-side lock member 102 to the unlocked state. Thus, a single right-side slide member 103 switches the first right-side lock member 101 and the second right-side lock member 102 between the locked state and the unlocked state.

That is, the length of the right-side slide member 103 is set to be longer than the dimension of the right-side seat frame member 91 in the front-rear direction. In a part of the right-side slide member 103 closer to its rear, there is formed a spring contact part 103*a* to which the rear end part of the right-side coil spring 104 contacts. The front end part of the right-side coil spring 104 contacts the inner surface of the right-side seat frame member 91, and the biasing force exerted by this right-side coil spring 104 acts on the right-side slide member 103 as a force that constantly biases the right-side slide member 103 rearward. In this embodiment, although the right-side slide member 103 is maintained in a state of having been slid rearward by the biasing force from the right-side coil spring 104, the right-side slide member 103 slides forward against the biasing force from the right-side coil spring 104 with operation of attaching the seat 3 to the wheelchair body 2, as hereinafter described. The position of the right-side slide member 103 having been slid rearward is the unlock position, whereas the position of the right-side slide member 103 having slid forward is the lock position.

To a part of the right-side slide member 103 closer to the front, a front-side regulator 103*b* is provided. When the right-side slide member 103 is slid to the rear and in the unlock position, the front-side regulator 103*b* is positioned to the rear of the first right-side lock member 101. When the right-side slide member 103 is slid forward and in the lock position, the front-side regulator 103*b* is positioned to contact the left-side surface of the first right-side lock member 101. The front-side regulator 103*b* is configured to push out the left-side surface of the first right-side lock member 101 to the right with a predetermined force or more so as to bring the first right-side lock member 101 into the locked state. That is the front-side regulator 103*b* is a member that causes the first right-side lock member 101 to be in the locked state and regulate retraction of the first right-side lock member 101 by contacting the first right-side lock member 101 in the locked state.

To a part of the right-side slide member 103 further rearward of the spring contact part 103*a*, a rear-side regulator 103*c* is provided. When the right-side slide member 103 is slid to the rear and in the unlock position, the rear-side regulator 103*c* is positioned to the rear of the second right-side lock member 102. When the right-side slide member 103 is slid forward and in the lock position, the rear-side regulator 103*c* is positioned to contact the left-side surface of the second right-side lock member 102. The rear-side regulator 103*c* is configured in a similar manner as the front-side regulator 103*b* and is a member that causes the second right-side lock member 102 to be in the locked state and regulate retraction of the second right-side lock member 102 by contacting the second right-side lock member 102 in the locked state.

Figure 16:
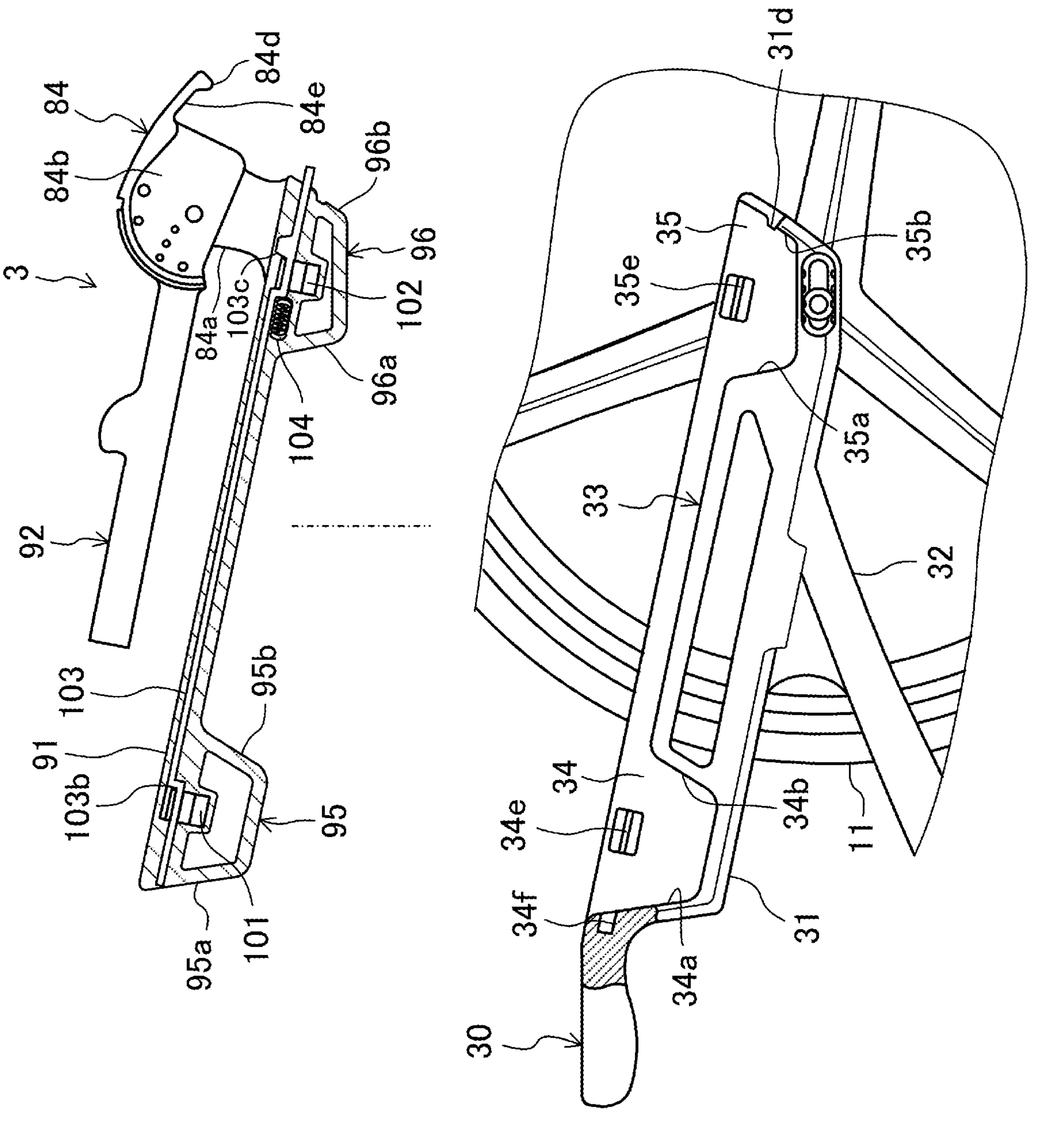
FIG. 16 is a partial cross-sectional view illustrating a state before a seat is attached to the wheelchair body.
Figure 19:
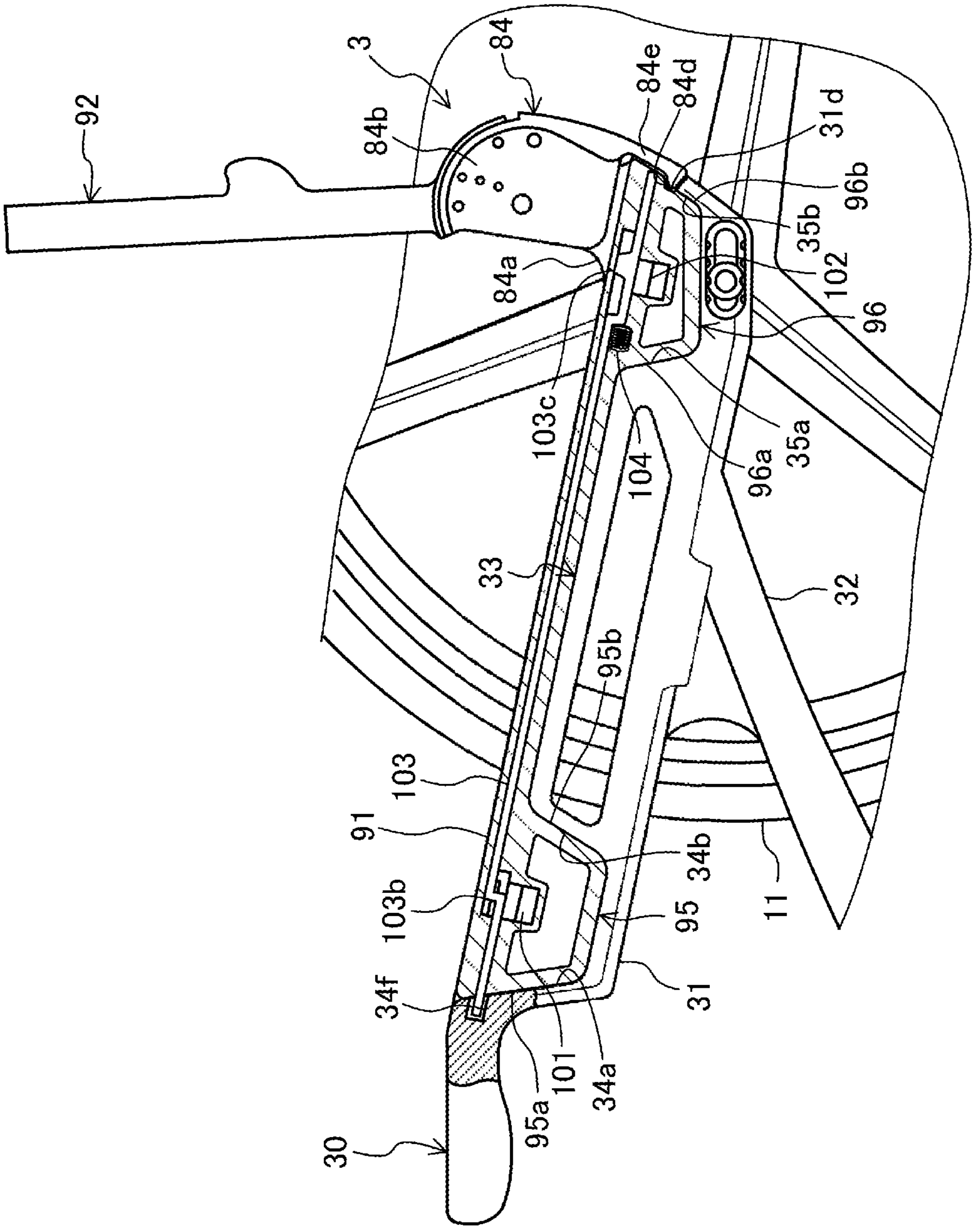
FIG. 19 is a view corresponding to FIG. 16, illustrating a state in which a seat back frame is erected.

As is also illustrated in FIG. 16, the rear end part of the right-side slide member 103 having been slid to the unlock position protrudes rearward from the rear end surface of the right-side seat frame member 91. On the other hand, the front end part of the right-side slide member 103 in the unlock position is within the right-side seat frame member 91. When the right-side slide member 103 slides forward to the lock position as illustrated in FIG. 19, the front end part of the right-side slide member 103 protrudes forward from the front end surface of the right-side seat frame member 91.

The front end part of the right-side slide member 103 engages with the right-side frame 30. As illustrated in FIG. 10, a right-side insertion hole (insertion part) 34*f* to serve as an engaging hole is formed on the front side of the upper frame part 31 of the right-side frame 30. The right-side insertion hole 34*f* is formed in a part of the upper frame part 31 corresponding to the front end part of the right-side slide member 103, and opens at the front-side engagement surface 34*a* of the front-side accommodation recess 34. Thus, the front end part of the right-side slide member 103 in the lock position is inserted into the right-side insertion hole 34*f* from the opening at the front-side engagement surface 34*a*.

Figure 18:
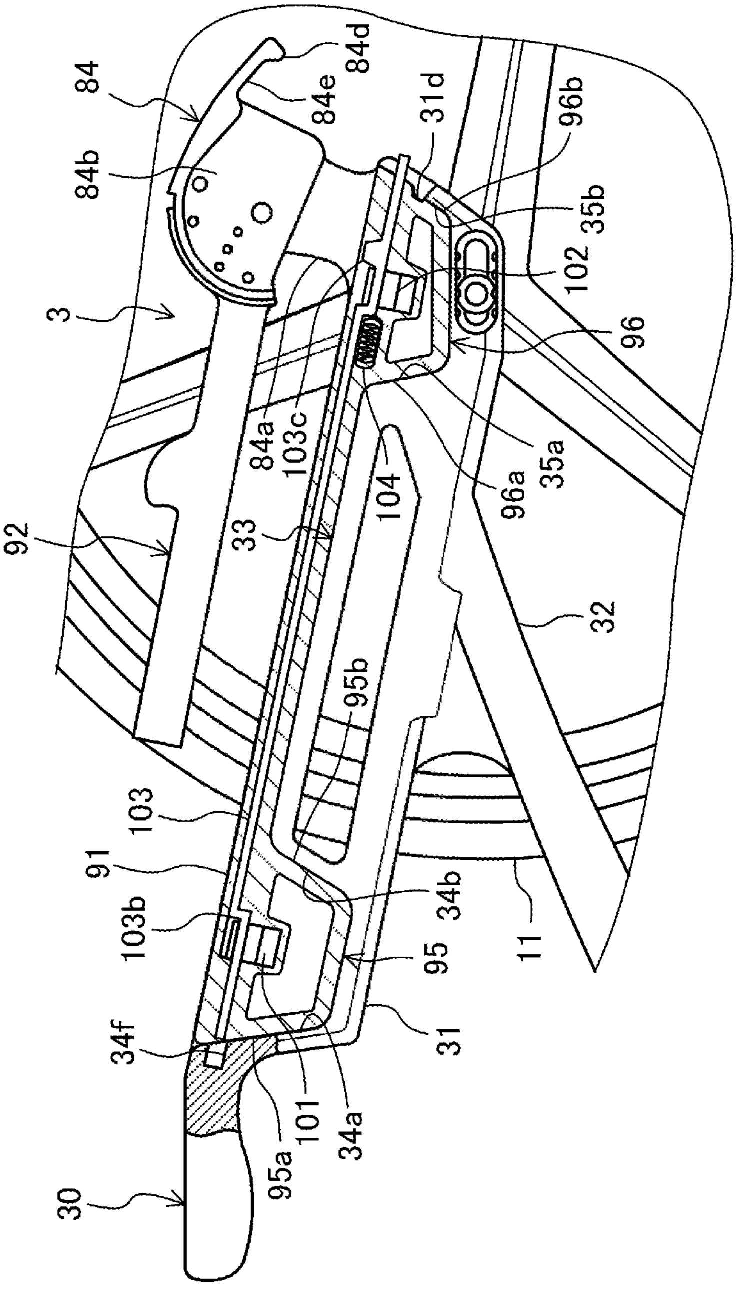
FIG. 18 is a view corresponding to FIG. 16, illustrating a state before the seat is placed on the wheelchair body and a seat back frame is erected.

The right-side slide member 103 in the unlock position is switched to the lock position in conjunction with operation of attaching the seat 3 to the wheelchair body 2. Specifically, the seat back frame 92 is folded down as illustrated in FIG. 16 before the seat 3 is attached to the wheelchair body 2. After that, the seat frame 7 is placed and fit to the left-side frame 20 and the right-side frame 30 of the wheelchair body 2 as illustrated in FIG. 18. Next, when the seat back frame 92 is pivoted to the erected state as illustrated in FIG. 19, the right-side pushing part 84*e* contacts the rear end part of the right-side slide member 103 and pushes the right-side slide member 103 forward with a predetermined force or more. This switches the right-side slide member 103 in the unlock position to the lock position in conjunction with the operation of bringing the seat back frame 92 to the erected state, and the first right-side lock member 101 and the second right-side lock member 102 are brought into the locked state and engages with the recessed parts 34*e*, 35*e*. At the same time, the front end part of the right-side slide member 103 is inserted and engaged with the right-side insertion hole 34*f* from the opening at the front-side engagement surface 34*a*. Therefore, the front end part of the right-side seat frame member 91 is restricted from being lifted up when the wheelchair user is seated.

Further, as illustrated in FIG. 3, the left-side seat frame member 90 includes a first left-side lock member 111, a second left-side lock member 112, the single left-side slide member 113, and a left-side coil spring (biasing member) 114, similarly to the right-side seat frame member 91.

The first left-side lock member 111 is arranged on the front side of the left-side surface of the left-side seat frame member 90 and is positioned to overlap the recessed part 24*e* (illustrated in FIG. 7) formed in the front-side accommodation recess 24 of the left-side frame 20, in a side view. In a side view, the first left-side lock member 111 and the front-side cross beam 97 overlap each other.

Further, the second left-side lock member 112 illustrated in FIG. 3 is arranged on the rear side of the left-side surface of the left-side seat frame member 90 and is positioned to overlap the recessed part 25*e* (illustrated in FIG. 7) formed in the rear-side accommodation recess 25 of the left-side frame 20, in a side view. In a side view, the second left-side lock member 112 and the rear-side cross beam 98 overlap each other.

The middle part of the first left-side lock member 111 relative to the upward-downward direction protrudes from the left-side surface of the left-side seat frame member 90 toward the left side of the left-side seat frame member 90 and enters the recessed part 24*e*. With the middle part of the first left-side lock member 111 in the recessed part 24*e*, the middle part contacts and engages with the inner surface of the recessed part 24*e*. Further, the middle part of the second left-side lock member 112 relative to the upward-downward direction enters and engages with the recessed part 25*e*.

The left-side slide member 113 and the left-side coil spring 114 are accommodated in the left-side seat frame member 90. The right-side slide member 103 is arranged to the right of the first left-side lock member 111 and the second left-side lock member 112, and is maintained slidable in the front-rear direction in the left-side seat frame member 90. The left-side slide member 113 is slidable between a lock position that maintains the locked state of the first left-side lock member 111 and the second left-side lock member 112, and the unlock position that brings the first left-side lock member 111 and the second left-side lock member 112 to the unlocked state.

In a part of the left-side slide member 113 closer to its rear, there is formed a spring contact part 113*a* to which the rear end part of the left-side coil spring 114 contacts. To a part of the left-side slide member 113 closer to the front, a front-side regulator 113*b* that contacts the first left-side lock member 111 is provided. To a part of the left-side slide member 113 further rearward of the spring contact part 113*a*, a rear-side regulator 113*c* that contacts the second left-side lock member 112 is provided.

The rear end part of the left-side slide member 113 in the unlock position protrudes rearward from the rear end surface of the left-side seat frame member 90. On the other hand, the front end part of the left-side slide member 113 in the unlock position is within the left-side seat frame member 90. When the left-side slide member 113 slides forward to the lock position, the front end part of the left-side slide member 113 protrudes forward from the front end surface of the left-side seat frame member 90.

The front end part of the left-side slide member 113 engages with the left-side frame 20. Although illustration is omitted, a left-side insertion hole (insertion part) is formed on the front side of the upper frame part 21 of the left-side frame 20. The left-side insertion hole is formed in a part of the upper frame part 21 corresponding to the front end part of the left-side slide member 113, and opens at the front-side engagement surface 24*a* of the front-side accommodation recess 24. Thus, the front end part of the left-side slide member 113 in the lock position is inserted into the left-side insertion hole from the opening at the front-side engagement surface 24*a*.

The left-side slide member 113 in the unlock position is also switched to the lock position in conjunction with operation of attaching the seat 3 to the wheelchair body 2. When the seat back frame 92 is brought into the erected state, the left-side pushing part 83*e* contacts the rear end part of the left-side slide member 113 and pushes the left-side slide member 113 forward with a predetermined force or more. This brings the first left-side lock member 111 and the second left-side lock member 112 into the locked state and engages them with the recessed parts 24*e*, 25*e*. At the same time, the front end part of the left-side slide member 113 is inserted and engaged with the left-side insertion hole. Therefore, the front end part of the left-side seat frame member 90 is restricted from being lifted up when the wheelchair user is seated.

(Variation 1)

Figure 20:
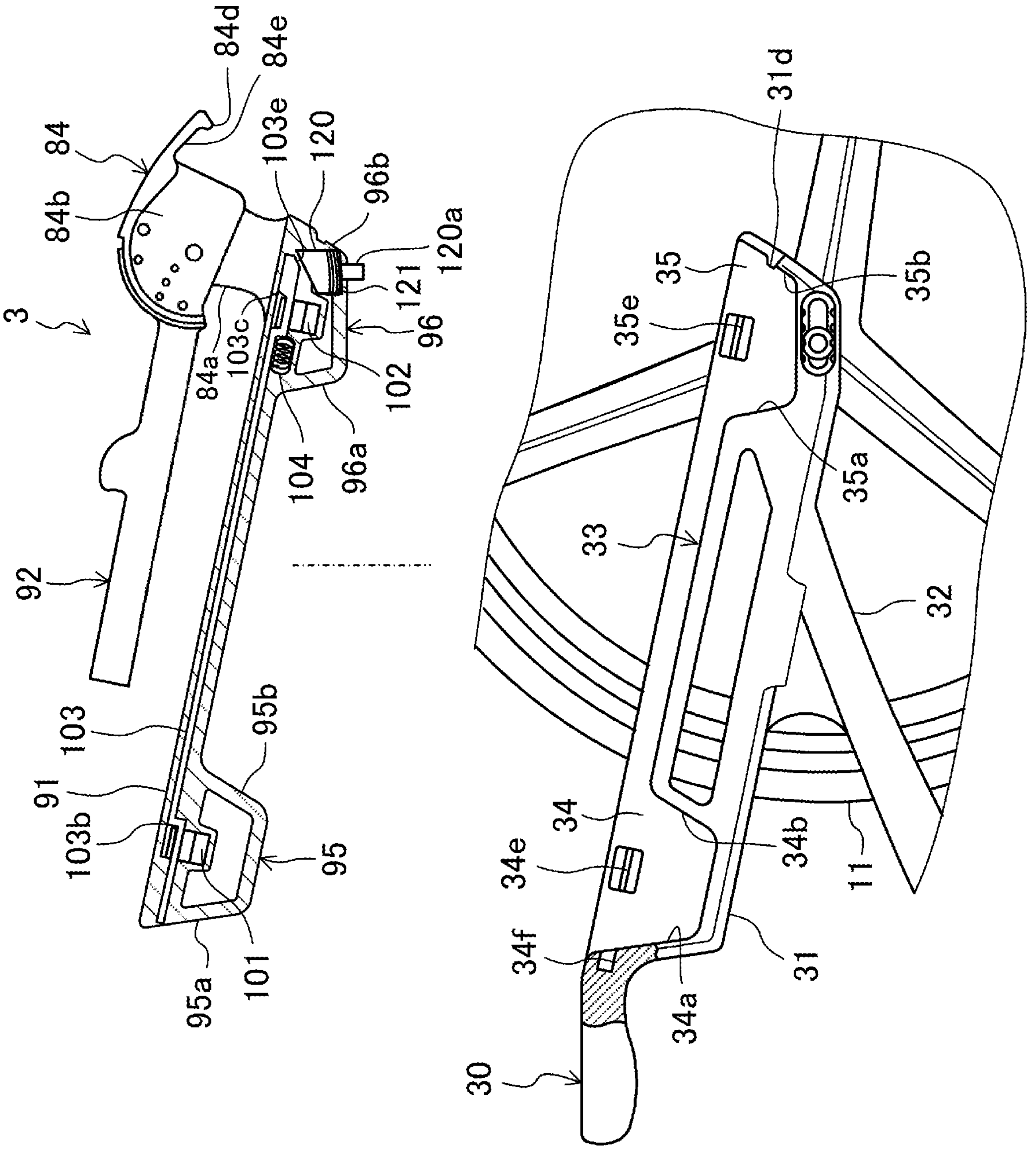
FIG. 20 is a view corresponding to FIG. 16, which relates to Variation 1 of the embodiment.
Figure 21:
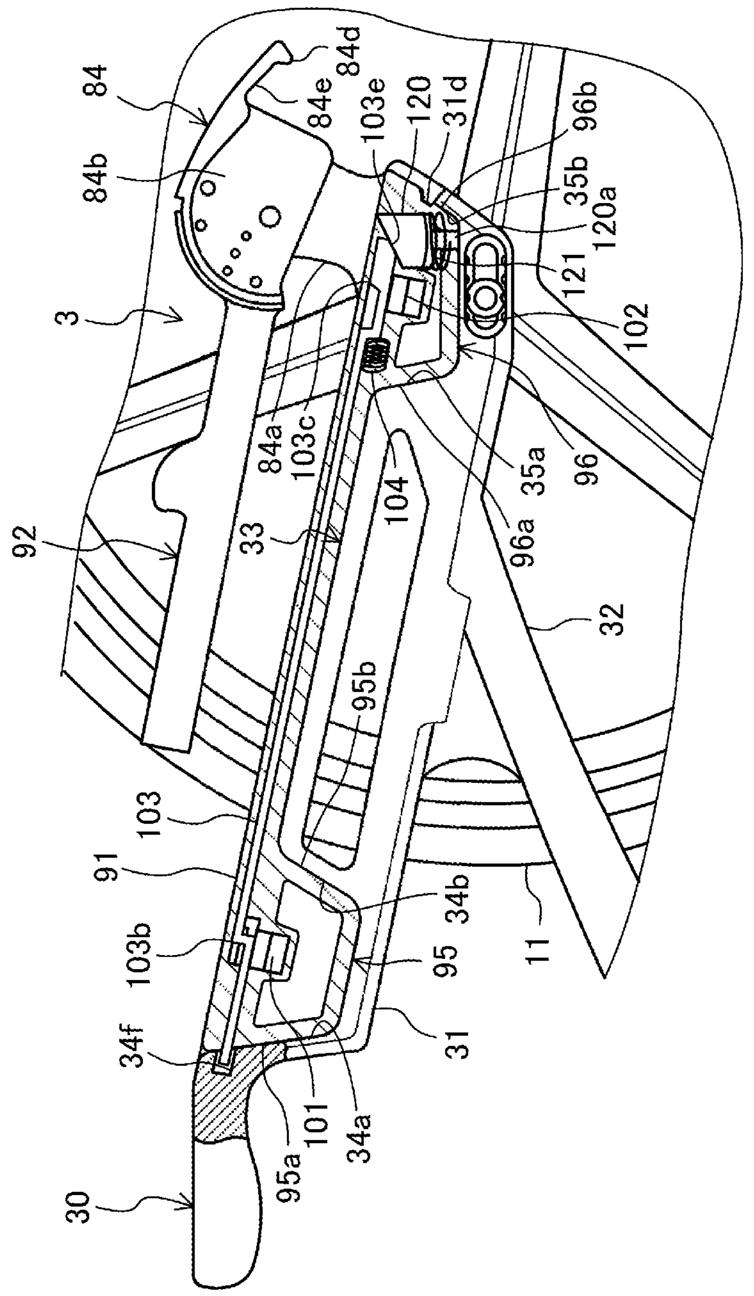
FIG. 21 is a view corresponding to FIG. 18, which relates to Variation 1 of the embodiment.
Figure 22:
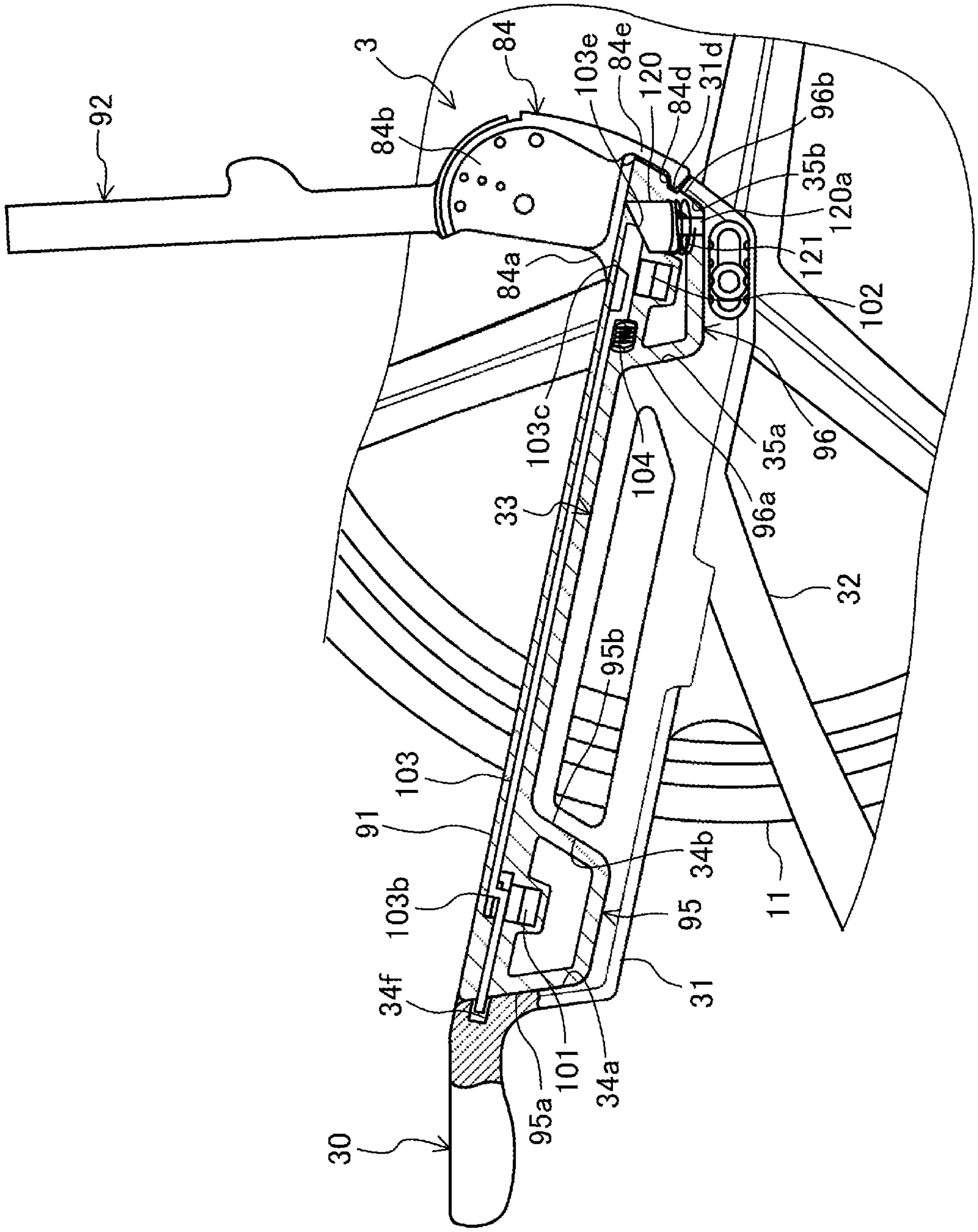
FIG. 22 is a view corresponding to FIG. 19, which relates to Variation 1 of the embodiment.

FIG. 20 to FIG. 22 are related to Variation 1 of the embodiment. Variation 1 is different from the above-described embodiment in that an elevation member 120 is used when switching the right-side slide member 103 in the unlock position to the lock position. Namely, to the rear end part of the right-side slide member 103, there is provided a sliding face 103*e* that is accommodated in the right-side seat frame member 91, and the elevation member 120 that slides on the sliding face 103*e* is held in the right-side seat frame member 91 in a slidable manner. The sliding face 103*e* is inclined so as to be higher toward the rear. Further, the upper surface of the elevation member 120 is a surface that slides on the sliding face 103*e*, and is inclined to be higher toward the rear side. On the lower side of the elevation member 120, there is provided a pin part 120*a* that penetrates the right-side seat frame member 91 and protrudes downward. Further, the right-side seat frame member 91 accommodates therein a spring 121 that constantly biases the elevation member 120 downward.

When the seat 3 is detached from the wheelchair body 2 in Variation 1 as illustrated in FIG. 20, the biasing force from the spring 121 moves the elevation member 120 to a down-end position and the right-side slide member 103 retracts to the unlock position. When the seat 3 in this state is attached to the wheelchair body 2, the pin part 120*a* of the elevation member 120 is pushed upward by the inner surface of the rear-side accommodation recess 35 of the upper frame part 31, as illustrated in FIG. 21. Therefore, the elevation member 120 rises against the biasing force from the spring 121. As the elevation member 120 rises, the upper surface of the elevation member 120 slides on the sliding face 103*e* of the right-side slide member 103. Since the sliding face 103*e* is inclined so as to be higher toward the rear side, a forward force acts on the right-side slide member 103, thereby switching the right-side slide member 103 to the lock position. In short, the right-side slide member 103 in the unlock position is switched to the lock position in conjunction with operation of attaching the seat frame 7 to the wheelchair body 2. Further, by switching the right-side slide member 103 to the lock position, the first right-side lock member 101 and the second right-side lock member 102 are also turned to the locked state. Note that the similar configuration can be applied to the left side.

(Variation 2)

Figure 23:
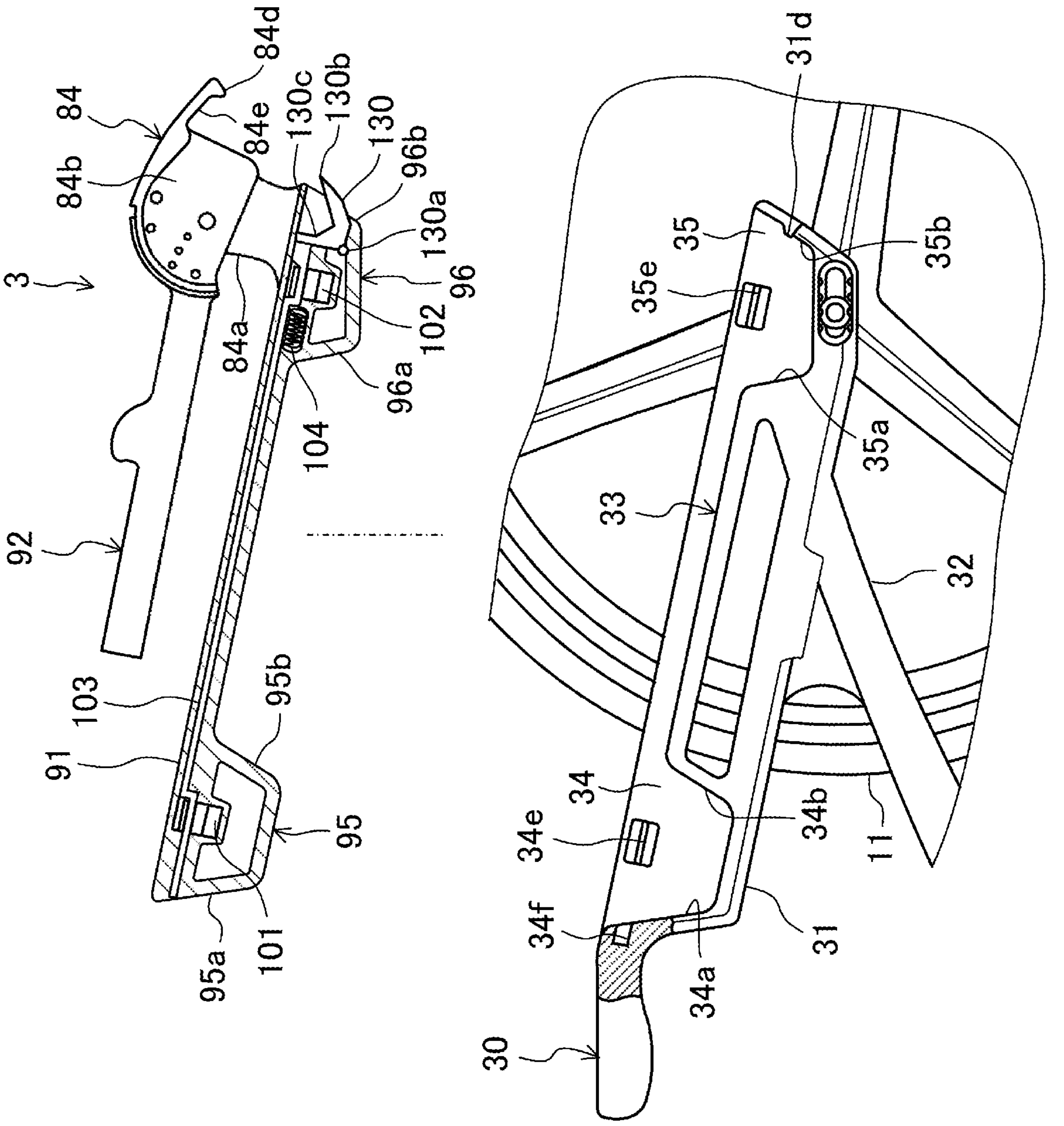
FIG. 23 is a view corresponding to FIG. 16, which relates to Variation 2 of the embodiment.
Figure 24:
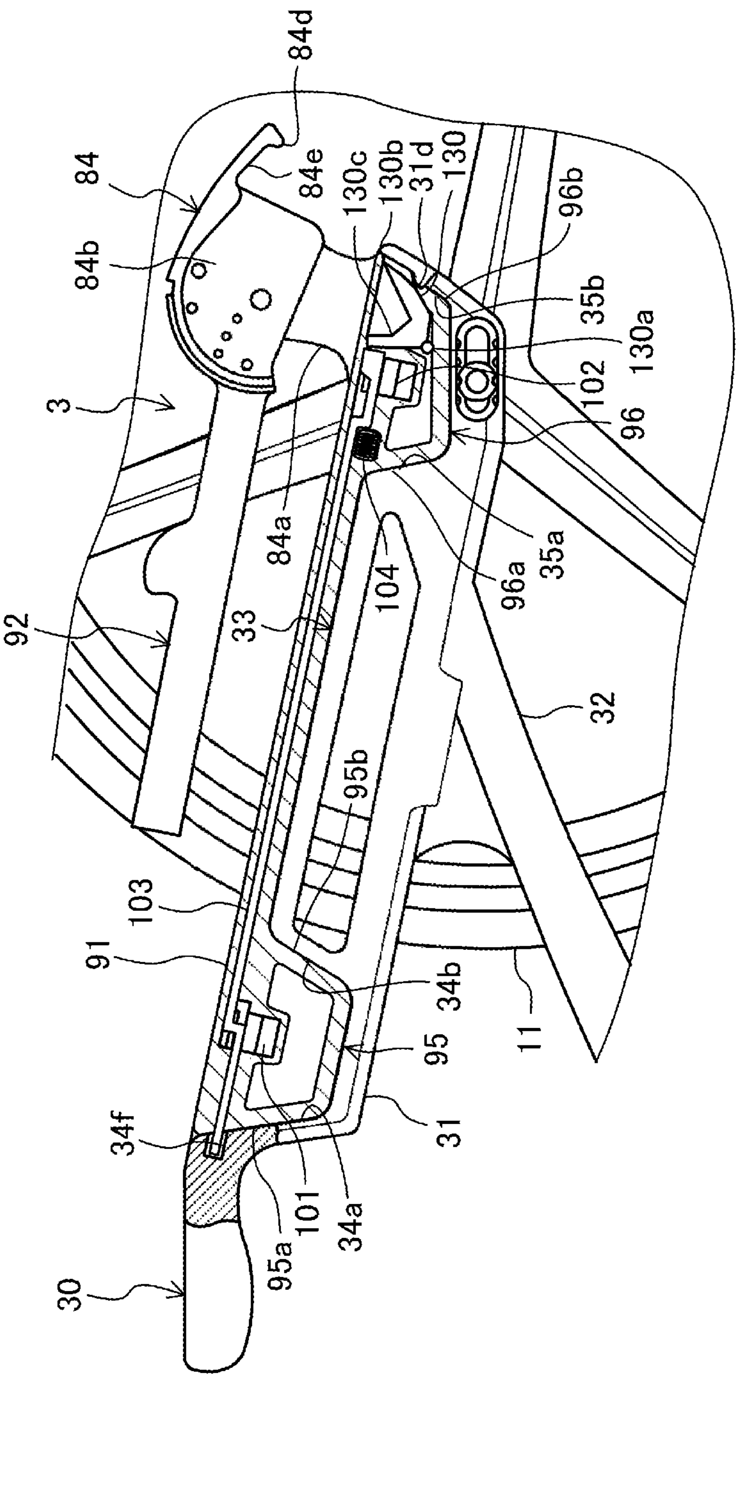
FIG. 24 is a view corresponding to FIG. 18, which relates to Variation 2 of the embodiment.
Figure 25:
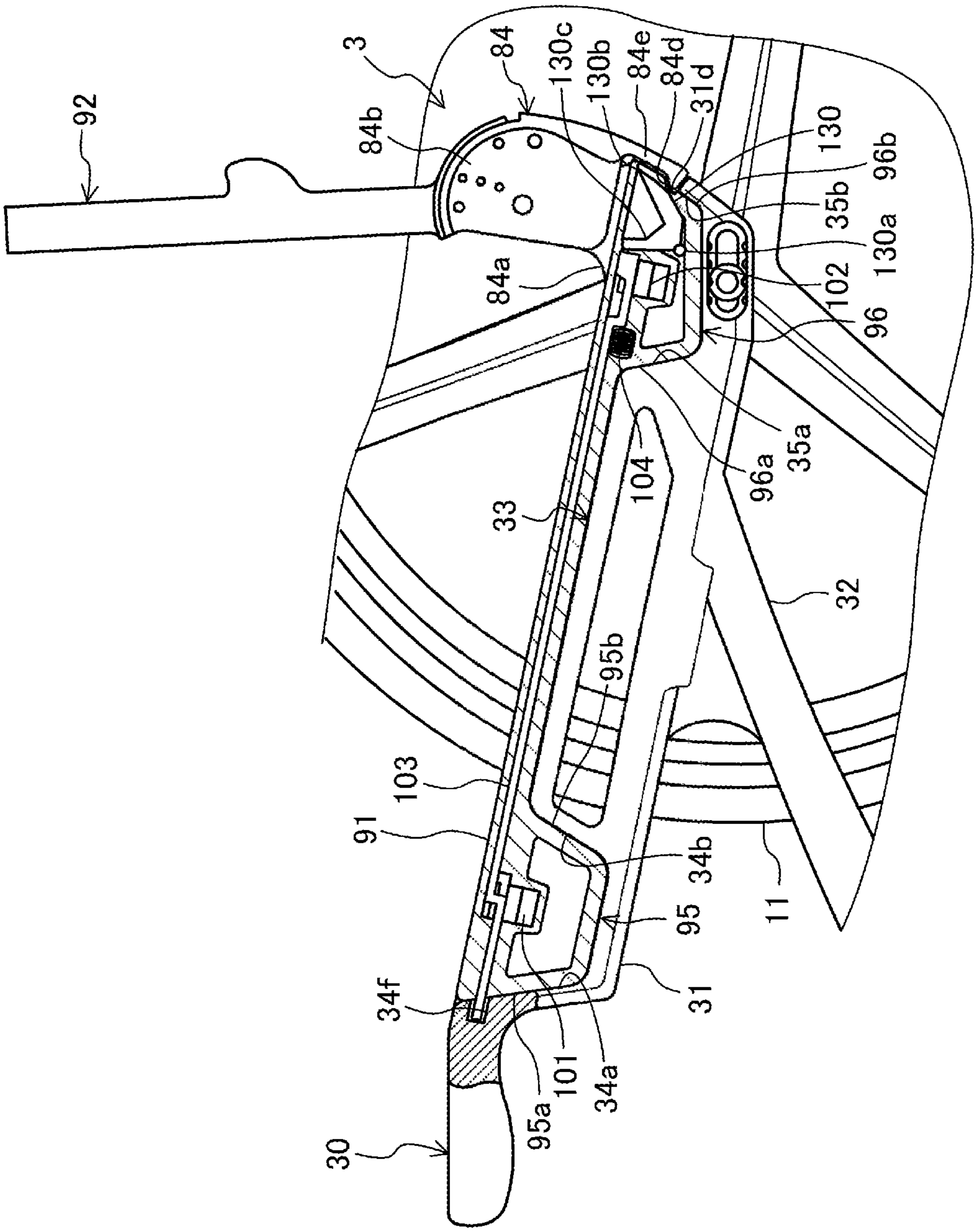
FIG. 25 is a view corresponding to FIG. 19, which relates to Variation 2 of the embodiment.

FIG. 23 to FIG. 25 are related to Variation 2 of the embodiment. Variation 2 is different from the above-described embodiment in that a cam 130 is used when switching the right-side slide member 103 in the unlock position to the lock position. Namely, the rear end part of the right-side slide member 103 is accommodated in the right-side seat frame member 91, and a cam 130 that contacts the rear end part is provided to the rear end part of the right-side seat frame member 91. The cam 130 is provided to the right-side seat frame member 91 in such a manner as to be pivotable about an axis 130*a* extending in the left-right direction. A rear part 130*b* of the cam 130 protrudes rearward from the right-side seat frame member 91. On the other hand, a front part 130*c* of the cam 130 extends to a position higher than the axis 130*a*, and is arranged to contact the rear end part of the right-side slide member 103.

When the seat 3 is detached from the wheelchair body 2 in Variation 2 as illustrated in FIG. 23, the biasing force from the right-side coil spring 104 moves and maintains the right-side slide member 103 in the unlock position and the rear end part of the right-side slide member 103 pushes the front part 130*c* of the cam 130 rearward and maintains the cam 130 in the position illustrated in the figure. When the seat 3 is attached to the wheelchair body 2 in this state, the rear part 130*b* of the cam 130 is pushed forward by the inner surface of the rear-side accommodation recess 35 of the upper frame part 31, causing the cam 130 to try to pivot forward. The pivoting force of the cam 130 is transmitted from the front part 130*c* to the rear end part of the right-side slide member 103, thus switching the right-side slide member 103 to the lock position as illustrated in FIG. 24. In short, the right-side slide member 103 in the unlock position is switched to the lock position in conjunction with operation of attaching the seat frame 7 to the wheelchair body 2. Further, by switching the right-side slide member 103 to the lock position, the first right-side lock member 101 and the second right-side lock member 102 are also turned to the locked state. Note that the similar configuration can be applied to the left side.

(Variation 3)

Figure 26:
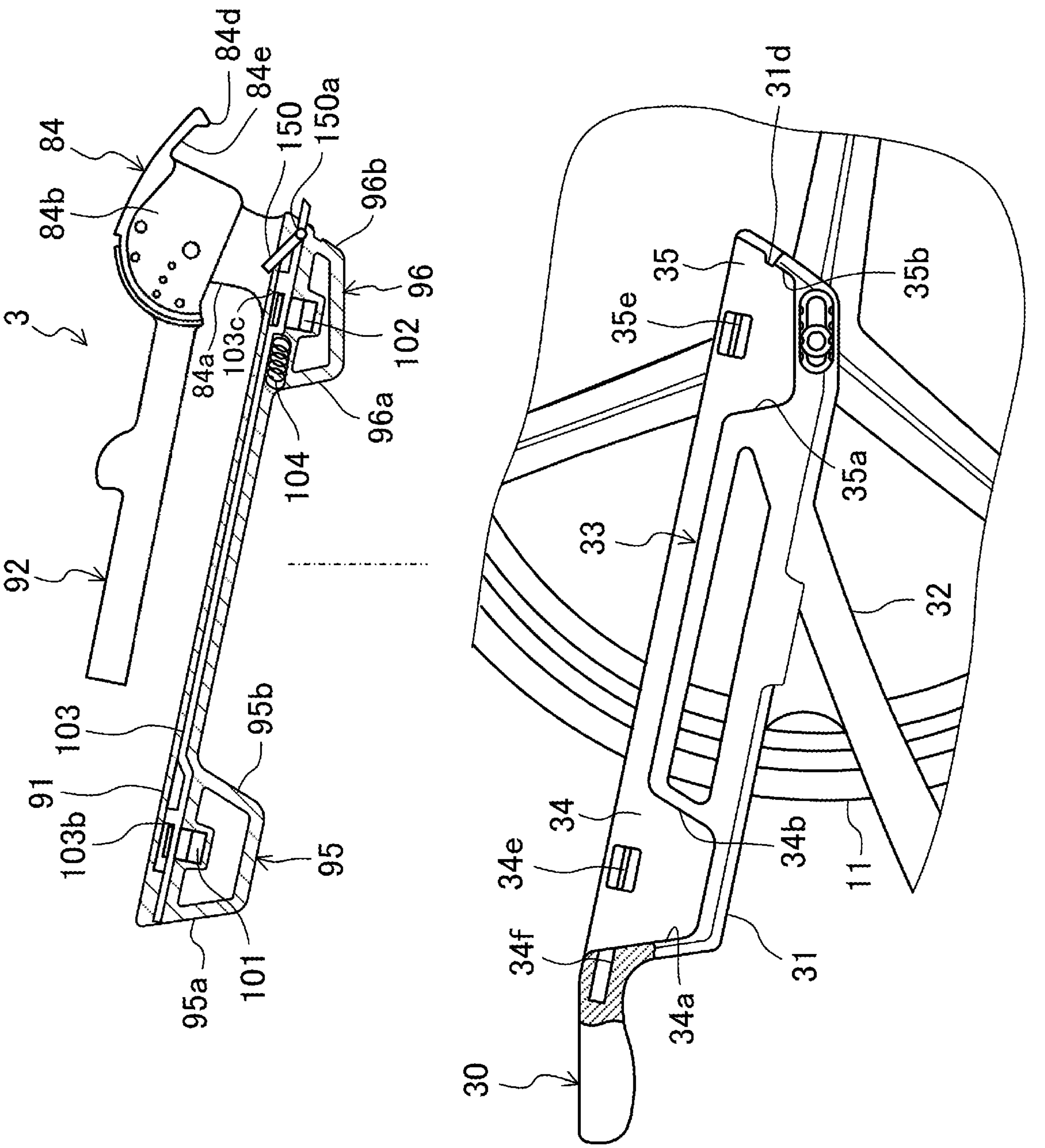
FIG. 26 is a view corresponding to FIG. 16, which relates to Variation 3 of the embodiment.
Figure 27:
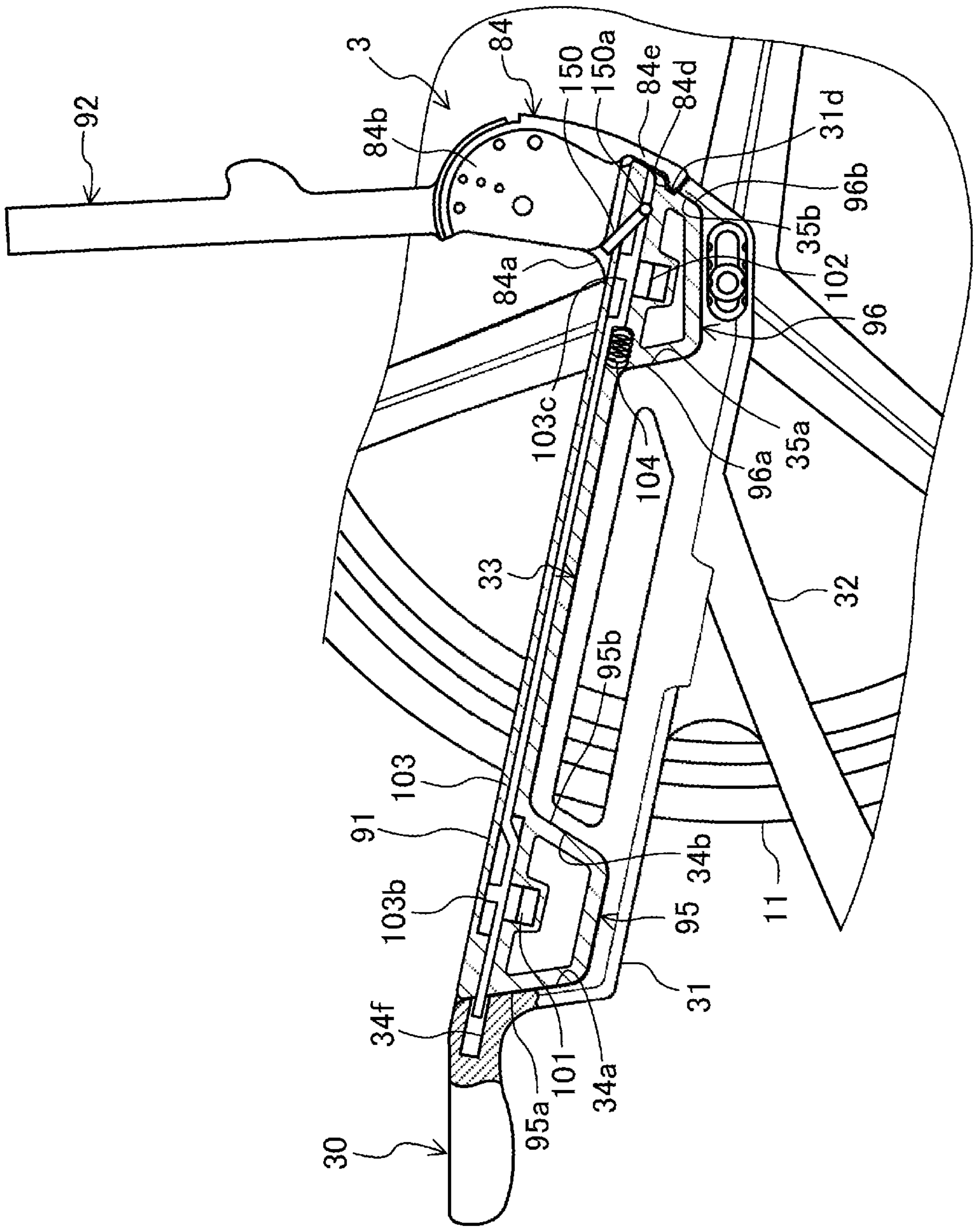
FIG. 27 is a view corresponding to FIG. 19, which relates to Variation 3 of the embodiment.
Figure 28:
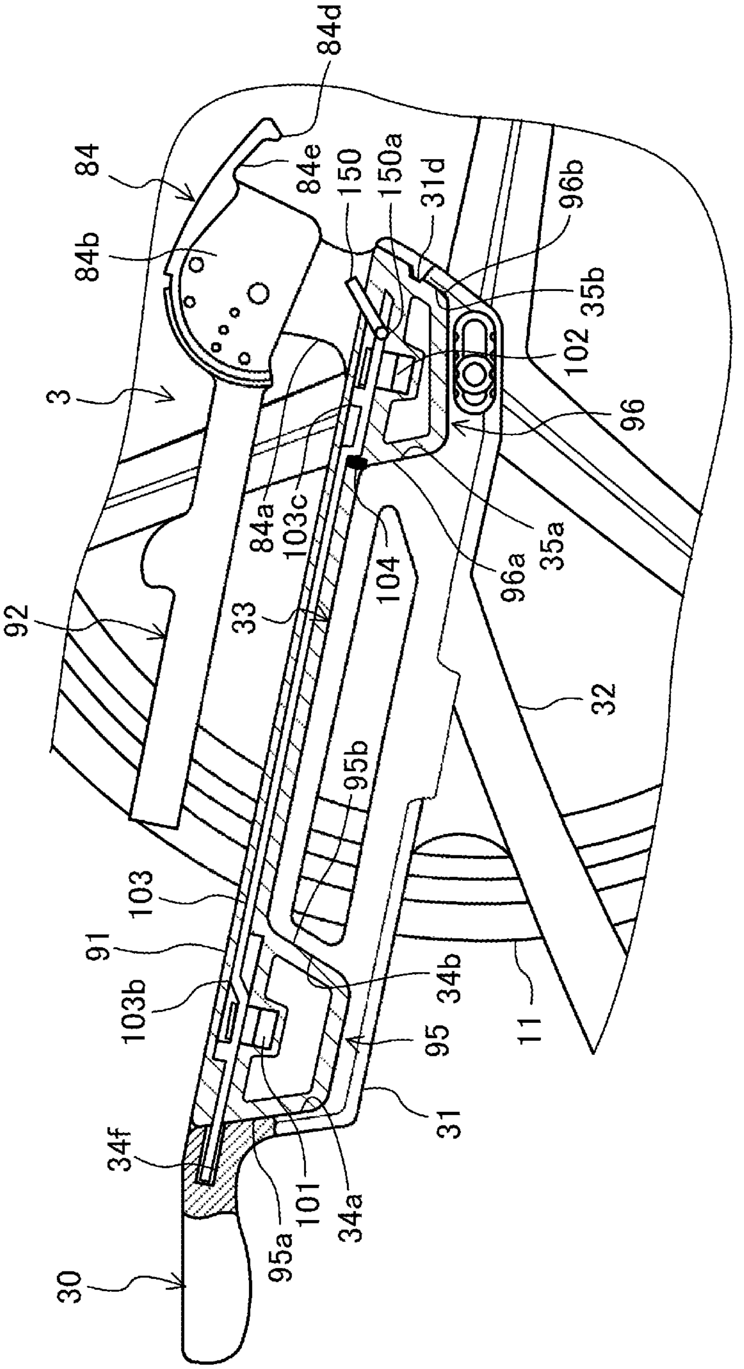
FIG. 28 is a view related to Variation 3, illustrating a case where a lock is released.

FIG. 26 to FIG. 28 are related to Variation 3 of the embodiment. Variation 3 is different from the above-described embodiment in that the inner surface of the rear-side accommodation recess 35 of the upper frame part 31 is used when switching the right-side slide member 103 in the unlock position to the lock position. Namely, when the seat 3 is attached to the wheelchair body 2 as illustrated in FIG. 27, the rear end part of the right-side slide member 103 contacts the rear-side engagement surface 35*b* of the rear-side accommodation recess 35 of the upper frame part 31. This way, the right-side slide member 103 is pushed forward by the rear-side engagement surface 35*b* and switched to the lock position. In short, the right-side slide member 103 in the unlock position is switched to the lock position in conjunction with operation of attaching the seat frame 7 to the wheelchair body 2.

Variation 3 includes an operation lever 150 for manually operating the right-side slide member 103. The operation lever 150 can be provided on the rear side of the right-side slide member 103. To the lower end part of the operation lever 150, a shaft 150*a* extended in the left-right direction is provided. With this shaft 150*a*, the operation lever 150 is freely pivotable with respect to the right-side slide member 103. As described hereinabove, while the right-side slide member 103 is in the lock position, the first right-side lock member 101 and the second right-side lock member 102 are also in the locked state, and the seat frame 7 cannot be detached. In this variation, by pivoting the operation lever 150 rearward, the right-side slide member 103 in the lock position can be slid further forward. This causes the front-side regulator 103*b* and the rear-side regulator 103*c* to move to the forward of the first right-side lock member 101 and the second right-side lock member 102, thus switching the first right-side lock member 101 and the second right-side lock member 102 to the unlocked state. By lifting the seat frame 7 obliquely rearward during this state, the right-side slide member 103 can be pulled out from the right-side insertion hole 34*f*, making the seat frame 7 detachable.

Alternatively, instead of providing the operation lever 150 in Variation 3, the rear end part of the right-side slide member 103 may be positioned higher than the intermediate part relative to the front-rear direction. This way, the rear end part of the right-side slide member 103 can be manually operated.

(Action and Advantages of Embodiment)

As described hereinabove, according to this embodiment, the wheelchair body 2 can be folded by operating the operation part 74 of the folding mechanism 70 in the upward-downward direction. Therefore, the folding operation can be done with one hand without a need for pulling a part of the wheelchair body 2, the driving wheel, or the like, and convenience can be improved.

Further, since the operation part 74 of the folding mechanism 70 is arranged below the upper end part of the left-side seat frame member 90 and the right-side seat frame member 91 with a predetermined space therebetween, the operation part 74 does not cause a wheelchair user seated to feel awkward, and a comfortable riding is achieved.

Further, since the operation part 74 of the folding mechanism 70 is arranged between the driving wheels 10, 11 and the casters 12, 13 in a side view of the vehicle body, it is possible to avoid the casters 12, 13 from hanging when the wheelchair 1 is lifted by holding the operation part 74. Thus, the wheelchair 1 lifted can be easily moved.

Further, there is provided a grip part 75 extended in a pivoting direction of the support arms 51, 61 at a time of switching from the folded state to the unfolded state. Therefore, at a time of unfolding the wheelchair body 2, the wheelchair body 2 can be unfolded by one hand, using the weight of the wheelchair body 2 itself.

Further, each of the front-side engagement surfaces 24*a*, 25*a*, 34*a*, 35*a* and the rear-side engagement surfaces 24*b*, 25*b*, 34*b*, 35*b* of the accommodation recesses 24, 25, 34, 35 provided to the side frames 20, 30 of the wheelchair body 2 are formed so as to be closer to the corresponding counterpart as it goes to the lower side. Therefore, the seat frame 7 can be easily attached to or detached from the wheelchair body 2, and is firmly fixed to the wheelchair body 2 at a time of attaching the seat frame 7.

Further, since the lock members 101, 102, 111, 112 of the seat frame 7 can be engaged in conjunction with the recessed parts 24*e*, 25*e*, 34*e*, 35*e* of the wheelchair body 2 in conjunction with operation of attaching the seat frame 7 to the wheelchair body 2, the seat frame 7 can be tightly attached to the wheelchair body 2 through a simple operation.

Further, since the seat frame 7 can be fixed to the wheelchair body 2 in conjunction with operation of attaching the seat frame 7 to the wheelchair body 2, a simple operation is achieved.

The foregoing embodiments are merely preferred examples in nature in all respects, and the scope of the present invention should not be interpreted in a limited manner. Further, variations and modifications of equivalents of the patent claims are intended to fall within the scope of the present invention.

As described hereinabove, a wheelchair according to the present invention can be used in cases of, for example, carrying the wheelchair on a motor vehicle or the like.

What is claimed is:

1. A foldable wheelchair that allows a wheelchair user to sit thereon, comprising:

a left-side frame having: a left-side upper frame part that pivotably supports a rear drive wheel on a left side of a vehicle body; a left-side caster support part that extends obliquely downward toward a front side of the vehicle body from an intermediate part of the left-side upper frame part relative to a front-rear direction of the vehicle body and has a lower end part spaced apart from the rear drive wheel towards a front of the vehicle body; and a left-side caster attached pivotably about a center line extending in an upward-downward direction at the lower end part of the left-side caster support part;

a right-side frame having a right-side upper frame part that pivotably supports a rear drive wheel on a right side of the vehicle body, a right-side caster support part that extends obliquely downward toward the front side from an intermediate part of the right-side upper frame part relative to the front-rear direction of the vehicle body and has a lower end part spaced apart from the rear drive wheel towards the front of the vehicle body; and a right-side caster attached pivotably about a center line extending in the upward-downward direction at the lower end part of the right-side caster support part;

a left-side support arm pivotably coupled to the left-side frame;

a right-side support arm pivotably coupled to the right-side frame;

a folding mechanism coupling the left-side support arm and the right-side support arm in a foldable manner in a left-right direction of the vehicle body;

a seat frame that supports a seat cushion part on which the wheelchair user sits and is configured to be detachably attachable to the left-side frame and the right-side frame; and a foot rest on which the wheelchair user sitting on the seat cushion part places their feet, wherein the left-side support arm includes a first left-side support arm and a second left-side support arm arranged on a rear side of the vehicle body relative to the first left-side support arm;

the right-side support arm includes a first right-side support arm and a second right-side support arm arranged on the rear side of the vehicle body relative to the first right-side support arm;

the folding mechanism couples the first left-side support arm and the first right-side support arm in a foldable manner that allows their inner ends in a vehicle width direction to be located rearward of their outer ends in the vehicle width direction when the wheelchair is folded, and couples the second left-side support arm and the second right-side support arm in a foldable manner that allows their inner ends in the vehicle width direction to be located rearward of their outer ends in the vehicle width direction when the wheelchair is folded;

the folding mechanism includes an interlocking member that couples, in an interlocking manner, the first left-side support arm and the first right-side support arm with the second left-side support arm and the second right-side support arm, an operation part for use in changing a state of the left-side support arm and the right-side support arm from one of a folded state or an unfolded state to another, and a support member that supports the operation part so as to enable switching between a state of having the operation part extending toward the rear of the vehicle body and a state of having the operation part raised upward relative to the state, such that the state of the first left-side support arm and the first right-side support arm is changed from the unfolded state to the folded state through an operation of switching the first state to the second state, and a folding force of the first left-side support arm and the first right-side support arm is transmitted to the second left-side support arm and the second right-side support arm by the interlocking member to cause the second left-side support arm and the second right-side support arm to be in the folded state, the operation part is arranged between the rear drive wheel and the left- and right-side casters in a side view of the vehicle body forward of a center of gravity of the wheelchair body while the seat frame is detached, the foot rest includes a left-side rest arm coupled to the lower end part of the left-side caster support part so as to be pivotable in the upward-downward direction when the wheelchair is folded and unfolded, a right-side rest arm coupled to the lower end part of the right-side caster support part so as to be pivotable in the upward-downward direction when the wheelchair is folded and unfolded, and a coupling plate that pivotably couples a right end part of the left-side rest arm and a left end part of the right-side rest arm with each other, and the foot rest, the first left-side support arm and the first right-side support arm, the second left-side support arm and the second right-side support arm, and a wheel shaft of the rear drive wheel are sequentially arranged from the front side toward the rear side of the vehicle body.

2. The wheelchair of claim 1, wherein the operation part is arranged above the first left-side support arm and the first right-side support arm and is for operating the first left-side support arm and the first right-side support arm.

* * * * *